United States Patent
Hossain et al.

(10) Patent No.: US 11,585,322 B1
(45) Date of Patent: Feb. 21, 2023

(54) WIND TURBINE CONTROL APPARATUS AND METHOD THEREFOR

(71) Applicant: KING FAHD UNIVERSITY OF PETROLEUM AND MINERALS, Dhahran (SA)

(72) Inventors: Mohammad Kamal Hossain, Dhahran (SA); Meer Abdul Mateen Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/825,541

(22) Filed: May 26, 2022

(51) Int. Cl.
  *F03D 7/04* (2006.01)
  *G05B 13/02* (2006.01)
  *F03D 7/02* (2006.01)
  *F03D 15/00* (2016.01)
  *F03D 1/00* (2006.01)
  (Continued)

(52) U.S. Cl.
  CPC .............. *F03D 7/046* (2013.01); *F03D 1/00* (2013.01); *F03D 7/028* (2013.01); *F03D 7/0224* (2013.01); *F03D 7/0276* (2013.01); *F03D 7/045* (2013.01); *F03D 9/25* (2016.05); *F03D 15/00* (2016.05); *G05B 13/027* (2013.01); *G05D 13/66* (2013.01); *F05B 2270/1033* (2013.01); *F05B 2270/709* (2013.01); *G05B 2219/2619* (2013.01)

(58) Field of Classification Search
  CPC ...... F03D 7/0224; F03D 7/0276; F03D 7/028; F03D 7/046; G05B 13/027; G05B 2219/2619; G05D 13/66; F05B 2270/1033; F05B 2270/709
  See application file for complete search history.

(56) References Cited

U.S. PATENT DOCUMENTS 5,798,631 A * 8/1998 Spee ............... F03D 7/046 322/29
8,150,641 B2 * 4/2012 Morjaria ............... F03D 7/046 702/60

(Continued)

FOREIGN PATENT DOCUMENTS

CN 101603502 B 11/2011
CN 111608868 B 3/2021

OTHER PUBLICATIONS

Nguyen, et al.; Combined RBFN based MPPT and d-axis stator current control for permanent magnet synchronous generators; International Journal of Power Electronics and Drive Systems (IJPEDS) vol. 12, No. 4; pp. 2459-2469; Dec. 2021; 11 Pages.

(Continued)

*Primary Examiner* — Tulsidas C Patel
*Assistant Examiner* — Thomas K Quigley
(74) *Attorney, Agent, or Firm* — Oblon, McClelland, Maier & Neustadt, L.L.P.

(57) ABSTRACT

A wind turbine control apparatus, method and non-transitory computer-readable medium are disclosed. The wind turbine control apparatus comprises a generator connected to a wind turbine with a drive train. The drive train comprises a rotor, a low speed shaft, a gear box, a high speed shaft, and a controller module. The controller module is configured to obtain a maximum power within a large range of varying wind velocities by operating the rotor at a neural network determined optimal angular speed for the current wind velocity.

20 Claims, 25 Drawing Sheets

(51) Int. Cl.
*F03D 9/25* (2016.01)
*G05D 13/66* (2006.01)

(56) References Cited

U.S. PATENT DOCUMENTS

| | | | | |
|---|---|---|---|---|
| 8,587,140 | B2* | 11/2013 | Egedal | G05B 13/027 290/44 |
| 8,774,949 | B2* | 7/2014 | Ou | G05B 13/0275 290/55 |
| 9,018,787 | B2* | 4/2015 | Dange | F03D 7/026 290/55 |
| 9,347,430 | B2* | 5/2016 | Abdur-Rahim | F03D 7/0224 |
| 10,671,039 | B2* | 6/2020 | Herzog | G05B 23/024 |
| 10,975,841 | B2* | 4/2021 | Beckerman | F03D 7/0276 |
| 11,015,576 | B2* | 5/2021 | Girardot | F03D 7/0224 |
| 11,208,986 | B2* | 12/2021 | Zen | F03D 7/0204 |
| 2010/0127495 | A1* | 5/2010 | Egedal | G05B 13/027 290/44 |
| 2011/0224926 | A1* | 9/2011 | Morjaria | F03D 7/046 702/60 |
| 2013/0085621 | A1* | 4/2013 | Ou | G06N 5/048 700/289 |
| 2013/0277970 | A1* | 10/2013 | Dange | F03D 7/0276 290/44 |
| 2014/0003939 | A1* | 1/2014 | Adams | F03D 7/0224 416/1 |
| 2014/0306451 | A1* | 10/2014 | Abdur-Rahim | F03D 7/0224 290/44 |
| 2015/0105924 | A1* | 4/2015 | Lazaris | H02J 3/004 700/287 |
| 2015/0184549 | A1* | 7/2015 | Pamujula | F02C 9/28 700/287 |
| 2015/0184550 | A1* | 7/2015 | Wichmann | G05B 13/04 700/287 |
| 2015/0185716 | A1* | 7/2015 | Wichmann | F02C 9/28 700/287 |
| 2017/0335829 | A1* | 11/2017 | Pedersen | F03D 7/0224 |
| 2020/0049129 | A1* | 2/2020 | Girardot | G05B 19/042 |
| 2021/0033062 | A1* | 2/2021 | Mishra | F03D 7/048 |
| 2021/0079890 | A1* | 3/2021 | Zhang | F03D 80/50 |
| 2021/0285421 | A1* | 9/2021 | Girardot | G06N 20/20 |
| 2021/0381489 | A1* | 12/2021 | Girardot | F03D 7/046 |

OTHER PUBLICATIONS

Tiwari, et al. ; Fuzzy Logic Based MPPT for Permanent Magnet Synchronous Generator in Wind Energy Conversion System ; IFAC-PapersOnLine 49-1 ; pp. 462-467 ; 2016 ; 6 Pages.

* cited by examiner

WIND TURBINE CONTROL APPARATUS AND METHOD THEREFOR

BACKGROUND

Technical Field

The present disclosure is directed to wind energy systems; and more particularly to an apparatus and a method for wind turbine control using machine learning for achieving maximum power at varying wind speeds.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Renewable Energy (RE) has taken a significant position in the generation of power due to the fact that the demand for energy is increasing. Conventional power generation methods have many environmental concerns in terms carbon footprint as well as depleting fossil fuel resources. Therefore, the RE market has been growing because of its generally positive effect on the environment. In particular, RE penetration in power generation has seen a rapid growth in last few decades. The global installed RE penetration was 1136 GW in the year 2009 which was increased to 2350 GW by 2018.

Various RE sources, including solar energy, wind energy, hydro energy, geothermal energy, tidal energy, and wave energy, are being implemented based on geographical favorability.

The concept of extraction of wind power has grown immensely to generate several GW of electricity today. Over this period the technology has improved significantly in terms of efficiency, reliability, cost, and performance. However, as the wind is naturally intermittent, power generation by the wind turbine is affected by the wind speed, the turbine rotor size, blade swept area, tip speed ratio, and rotor speed. For instance, the wind turbines operate in a specific range of wind speeds bounded cut-in and cut-out speed, and shutdown for any wind speed out of the wind speeds bounds to protect the generator and the turbine. This leaves a challenge in estimating the maximum power attained by the turbine.

Wind turbines are available in horizontal, vertical, fixed speed or variable speed configurations. Different kinds of variable speed wind turbine generator have been employed for wind turbines. Permanent Magnet Synchronous Generators (PMSG) based wind turbines have emerged as robust techniques for wind power harvesting. Variable speed wind turbine generators fed by PMSG are often preferred due to their better efficiency, less maintenance and good power quality. However, due to the intermittence of the wind speed, there is a need of effective maximum power point tracking (MPPT) control means that can effectively track maximum power and generates a reference angular speed at a shaft to drive a rotor of the PMSG based wind turbine.

There are known control strategies for output maximization of the PMSG-based small-scale wind turbine. Other controls have also been used in the literature, like the generator side inverter controller, grid side inverter controller, pitch angle controller, maximum power point tracking (MPPT) controller.

As wind power harvesting is increasing all over the globe, other control strategies for MPPT have also evolved. Many techniques are used in the literature for MPPT algorithms, such as Perturb & Observe method (P&O), Power Signal Feedback (PSF) control, Tip Speed Ratio (TSR) control, and Optimal Torque (OT) control. TSR is simple, where optimal tip speed ratio is determined by achieving the maximum power coefficient. However, this method is not suitable for precise measurements and increases the cost of the system. OT and PSF controls are simple and fast, but with low efficiency than TSR control method. The hill climb method, also known as P&O, is a widely used MPPT technique for wind power estimation as it does not need field testing due to it being independent of turbine characteristics. However, because of the slow response of the wind energy conversion system (WECS) caused by large inertia, it is not suitable for MPPT control.

Further, an MPPT control of wind energy system has been proposed by estimating the wind speed based on support vector regression. This technique has been found to be effective with less than 3.3% error. Another proposal demonstrated a method of speed control for wind turbine PMSG driven by a DC motor. However, in such techniques, MPP was estimated only for small range of wind speed between 5-8 m/s.

Furthermore, some intelligent techniques have been developed with higher accuracy like fuzzy logic which can estimate MPPT in WECS. Although, fuzzy logic enhanced the performance of the parameters; at the same time it is more expensive and not accurate in estimating wind speed. Also, artificial neural network (ANN) was employed to estimate wind speed and power. The NN method generally performs effectively after it is trained offline to use it in online environment as have been confirmed for photovoltaic systems. However, Soetedjo A et al. (2011) tracks the maximum power that could be extracted from the wind energy due to the non-linear characteristic of the wind turbine, and does not provide an optimum rotor speed to be implemented for the PMSG based wind turbine to achieve the maximum power therefrom.

Further, CN Granted Patent No. 111608868B discloses a maximum power tracking self-adaptive robust control system and method for a wind power generation system, which controls angular speed of a wind wheel in real time to enable the wind wheel to track optimal angular speed of the wind wheel, so that output power of wind power generation system reaches the maximum output power, and meanwhile, adaptive robust control module can be used for self-learning and training to ensure that the output power of fan stably tracks the maximum output power.

CN Granted Patent No. 101603502B relates to a wind energy control method based on artificial intelligence, comprising the following steps: calculating characteristic parameters of wind speed v, which include a mean value muv, a mean square value sigmav and frequency fv; recognizing a nonlinear relation curve P=P(v, n, beta) of the characteristic parameters of the wind speed v, the rotating speed n of a windmill, a paddle pitch angle beta and the output power P of a wind power generating set on line by an artificial neural network method, and an intelligent controller properly starting the training of the artificial neural network according to a deviation value (delta P=P−P<*>) of the output power P of the wind power generating set and the artificial neural network.

Non-patent reference titled "Fuzzy logic based MPPT for permanent magnet synchronous generator in wind energy conversion system" presents a comparative analysis of different control methods to extract the maximum power from Permanent Magnet Synchronous Generator (PMSG) based Wind Energy Conversion System (WECS) under different wind speed condition. The Maximum Power Point Tracking (MPPT) control technique compared in this reference are Proportional Integral (PI) control, Perturb and Observe (P&O) method and Fuzzy Logic Controller (FLC). The parameters considered for analyzing the efficiency of the MPPT controller is the output DC voltage and power across the load.

Each of the above references suffers from one or more drawbacks hindering their adoption, including at least some of the shortcomings of the known wind energy control systems and methods as described above. For example, none of the above references teaches about training a neural network (NN) model in which a sampled wind speed is fed as input while the optimum rotor speed and the maximum power are output from the neural network; and the PMSG based wind turbine is controlled based on a current wind speed and the optimum rotor speed determined by the NN model.

Accordingly, it is an object of the present disclosure to provide a method, apparatus and system for neural network based control of a wind turbine that may efficiently and robustly tracks and adjusts for maximum power at optimum rotor speed.

SUMMARY

In an exemplary embodiment, a wind turbine control apparatus is provided. The wind turbine control apparatus comprises a generator connected to a wind turbine with a drive train. The drive train comprises a rotor, a low speed shaft, a gear box, a high speed shaft, and a controller module. The controller module is configured to implement a machine learning neural network method considering wind speed, as well as blade pitch angle, tip speed ratio, radius of a wind turbine rotor, air density, maximum power coefficient, optimum tip speed, maximum power, gear ratio, stator phase resistance and armature inductance as input, and output a maximum power at varying wind speeds and a reference angular speed at varying wind speeds.

In one or more exemplary embodiments, the generator is a Permanent Magnet Synchronous Generator (PMSG).

In one or more exemplary embodiments, the wind turbine control apparatus drives the wind turbine based on the maximum power or the reference angular speed at varying wind speeds generated by the machine learning neural network method.

In one or more exemplary embodiments, the maximum power ($P_{max}$) at any given wind speed is given by:

$$P_{max} = \tfrac{1}{2}\rho A V_w^3 C_{pmax}(\lambda,\beta)$$

where $\rho$ is air density, A is blade swept area, $V_w$ is wind velocity and $C_{pmax}$ is a power coefficient which is depicted by function of $(\lambda,\beta)$.

In one or more exemplary embodiments, optimum rotor speed ($\omega_{opt}$) at the maximum power is given by:

$$\omega_{opt} = \frac{\lambda_{opt} V_w}{R}$$

where $\lambda_{opt}$ is optimal tip speed ratio, $V_w$ is wind velocity and R is the radius of the wind turbine rotor.

In one or more exemplary embodiments, the wind turbine achieves a maximum power output and an optimum reference angular speed for a fluctuating wind speed between 3 m/s and 19.4 m/s.

In one or more exemplary embodiments, the wind turbine control apparatus stops the wind turbine for wind speeds below 3 m/s and above 19.4 m/s.

In one or more exemplary embodiments, the wind turbine achieves an optimum angular rotation within 10 ms of a wind speed change.

In another exemplary embodiment, a wind energy control method for a Permanent Magnet Synchronous Generator (PMSG) based wind turbine is provided. The method comprises generating a data set, wherein wind speed and tip speed ratio are averagely sampled. The method further comprises calculating a maximum power ($P_{max}$) and an optimum rotor speed ($\omega_{opt}$) for every sample of wind speed. The method further comprises training a neural network (NN) model, wherein a sampled wind speed is fed as input while the optimum rotor speed ($\omega_{opt}$) and the maximum power ($P_{max}$) are output from the neural network. The method further comprises testing the NN model. The method further comprises controlling the PMSG based wind turbine based on a current wind speed and the optimum rotor speed ($\omega_{opt}$) determined by the NN model.

In one or more exemplary embodiments, a feed forward back propagation method is used in the training of the neural network model.

In one or more exemplary embodiments, a radial basis function method is used in the training of the neural network model.

In one or more exemplary embodiments, the maximum power ($P_{max}$) at any given wind speed is given by:

$$P_{max} = \tfrac{1}{2}\rho A V_w^3 C_{pmax}(\lambda,\beta)$$

where $\rho$ is air density, A is blade swept area, $V_w$ is wind velocity and $C_{pmax}$ is a power coefficient which is depicted by function of $(\lambda,\beta)$.

In one or more exemplary embodiments, the optimum rotor speed ($\omega_{opt}$) at the maximum power is given by:

$$\omega_{opt} = \frac{\lambda_{opt} V_w}{R}$$

where $\lambda_{opt}$ is optimal tip speed ratio, $V_w$ is wind velocity and R is the radius of the wind turbine rotor.

In yet another exemplary embodiment, a non-transitory computer readable medium having instructions stored therein that, when executed by one or more processors, cause one or more processors to perform a control method for wind turbine control is provided. The method comprises generating a data set, wherein wind speed and tip speed ratio are averagely sampled. The method further comprises training a neural network model, wherein wind speed and tip speed ratio are fed as input, and a maximum power ($P_{max}$) and an optimum rotor speed ($\omega_{opt}$) are output. The method further comprises testing of the neural network model with random input wind speed. The method further comprises speed control of a Permanent Magnet Synchronous Generator (PMSG) based wind turbine according to the $P_{max}$ from the neural network model.

In one or more exemplary embodiments, the instructions stored cause the one or more processors to calculate the maximum power ($P_{max}$) at any given wind speed by:

$$P_{max} = \tfrac{1}{2}\rho A V_w^3 C_{pmax}(\lambda,\beta)$$

where ρ is air density, A is blade swept area, $V_w$ is wind velocity and $C_{pmax}$ is a power coefficient which is depicted by function of $(\lambda,\beta)$.

In one or more exemplary embodiments, the instructions stored cause the one or more processors to calculate the optimum rotor speed ($\omega_{opt}$) at the maximum power by:

$$\omega_{opt} = \frac{\lambda_{opt} V_w}{R}$$

where $\lambda_{opt}$ is optimal tip speed ratio, $V_w$ is wind velocity and R is the radius of the wind turbine rotor.

In one or more exemplary embodiments, the instructions stored therein cause the PMSG based wind turbine to achieve a maximum power output and an optimum reference angular speed under fluctuating wind speed between 3 m/s and 19.4 m/s.

In one or more exemplary embodiments, the instructions stored therein cause the PMSG based wind turbine to shut down for wind speeds below 3 m/s and above 19.4 m/s.

In one or more exemplary embodiments, the instructions stored therein cause the neural network model to be trained using a feed forward back propagation method.

In one or more exemplary embodiments, the instructions stored therein cause the neural network model to be trained using a radial basis method.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
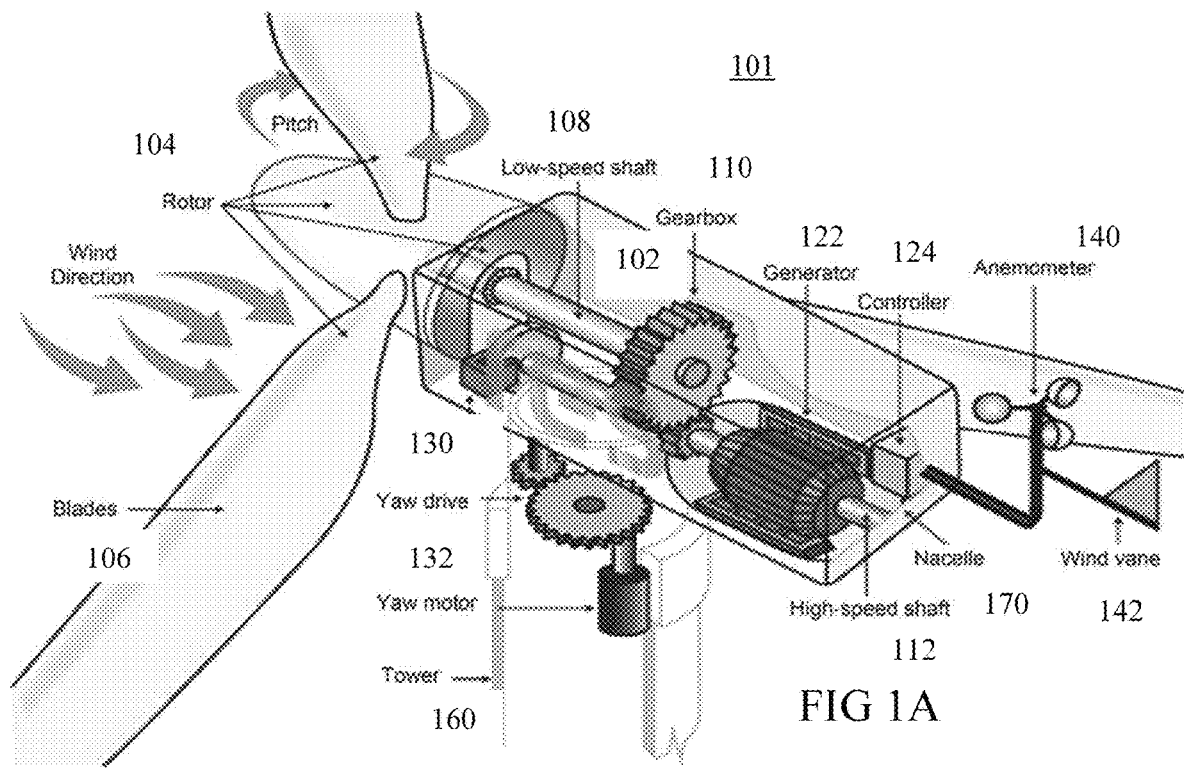
FIG. 1A illustrates details of the wind energy apparatus including the wind turbine, the rotor and the blades and other elements of the wind turbine.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a neural network (NN) based wind turbine model for tracking maximum power in wind energy systems, particularly a Permanent Magnet Synchronous Generator (PMSG) based wind turbine. The present disclosure provides implementation of speed control for the PMSG based wind turbine using the NN based wind turbine model that effectively track estimated angular speed at maximum power therefor and thereby efficiently determines an optimum reference angular speed to drive a rotor of the PMSG based wind turbine.

Referring to FIG. 1A, illustrated is a diagram of a of a wind energy system (WES) 101, sometimes also referred to as wind energy conversion system (WECS), in which a wind turbine (represented by reference numeral 101) is associated with a wind turbine control apparatus (represented by reference numeral 120), in accordance with one or more embodiments of the present disclosure. As may be understood, the wind turbine 101 operates by transforming kinetic energy extracted from blowing wind into mechanical energy, which, in turn, may be used to generate power output (for example, in form of electrical power or mechanical work). Generally, the power output of wind energy systems varies depending on wind speed. Due the non-linear characteristic of the wind energy systems, the maximum power output may not be obtained for all wind speed conditions. In the present disclosure, the wind turbine control module 124 is configured to control operations of the wind turbine 101 to efficiently generate power therefrom in consideration to the intermittence of wind speed, as discussed later in more detail.

As illustrated in FIG. 1A, the wind turbine 101 includes a drive train 102 which mechanically connects various components of the wind turbine 101. The drive train 102 includes a rotor 104 (also sometimes referred to as "wind turbine rotor" without any limitations) which is the rotating part of the wind turbine 101. The rotor 104 may be provided with two or more blades 106 to extract energy from blowing wind. An ideal rotor can extract a theoretical maximum of 59.3% of the kinetic energy which is known as the Betz limit of the kinetic energy from the wind. If a wind turbine was 100% efficient, then all of the wind would stop completely upon contact with the turbine which is not the case.

The rotor 104 may be part of a horizontal access wind turbine (HAWT) or a vertical access wind turbine (VAWT) with HAWT being the dominant design configuration. The HAWT also allows for pitch and yaw control of the turbine which may be accomplished by a Yaw drive 130 and a yaw motor 132. VAWT has the advantage of allowing for heavy generating equipment to be mounted on the ground. Modern HAWT wind turbines used for electrical generation typically include 3 blades 106 as 3 blade HAWT systems have been found to be among the most efficient. Two bladed wind turbine are also efficient with three or four blades being marginally more efficient. However, the slightly higher efficiency is often weighed against the extra material, construction, and maintenance costs of a four or more blade system.

Curved blades 106 are typically used and are very similar to a long airplane wing (also known as an aero foil) which has a curved surface on top. The curved blade has air flowing around it with the air moving over the curved top of the blade faster than it does under the flat side of the blade, which makes a lower pressure area on top, and therefore, as a result, is subjected to aerodynamic lifting forces which create movement. The net result is a lifting force perpendicular to the direction of flow of the air over the turbines blade.

If the turbines propeller blades rotate too slowly, it allows too much wind to pass through undisturbed, and thus does not extract as much energy as it potentially could. If the propeller blade rotates too quickly, though, it appears to the wind as a large flat rotating disc, which creates a large amount of drag.

It's known that by slightly curving the turbine blade, they're able to capture 5 to 10 percent more wind energy and operate more efficiently in areas that have typically lower wind speeds. Then the optimal tip speed ratio, TSR, which is defined as the ratio of the speed of the rotor tip to the wind speed, depends on the rotor blade shape profile, the number of turbine blades, and the wind turbine propeller blade design itself.

Blades with tip speed ratios of six to nine utilizing an aero foil design are found to have negligible drag and tip losses, The drive train 102 of a wind turbine is composed of the gearbox 110 and the generator 122, the necessary components that a turbine needs to produce electricity. The gearbox 110 is responsible for connecting the low-speed shaft 108 to the high-speed shaft 112 which in turn is attached to the generator 122. Assisted by a series of gears of varying sizes, the gearbox 110 converts the slow rotation of the blades 106—to the higher rotation, that the generator needs to begin producing electricity. The gearbox comprises the low speed shaft 108 connected to the rotor 104, a gear box 110 connected to the low speed shaft 108 from one side thereof, and a high speed shaft 112 connected to gear box 110 from other side The drive train 102 converts low-speed rotation of the rotor 104 (from wind energy) to high-speed rotation at the high speed shaft 112 using the gear box 110, such that the high-speed rotation of the high speed shaft 112 is connected to a generator 122 utilized for generating the power output, the generator connected to a controller module 124. Also shown in FIG. 1A is a tower 160, to elevate the rotor in the air, an anemometer 140 which measures wind speed, a wind vane 142 which measures wind direction and a nacelle 170 which may act as a streamlined housing for all the generating components including the generator 122, gearbox 110, drive train 102, brake assembly (not illustrated) and the controller module 124.

Figure 1B:
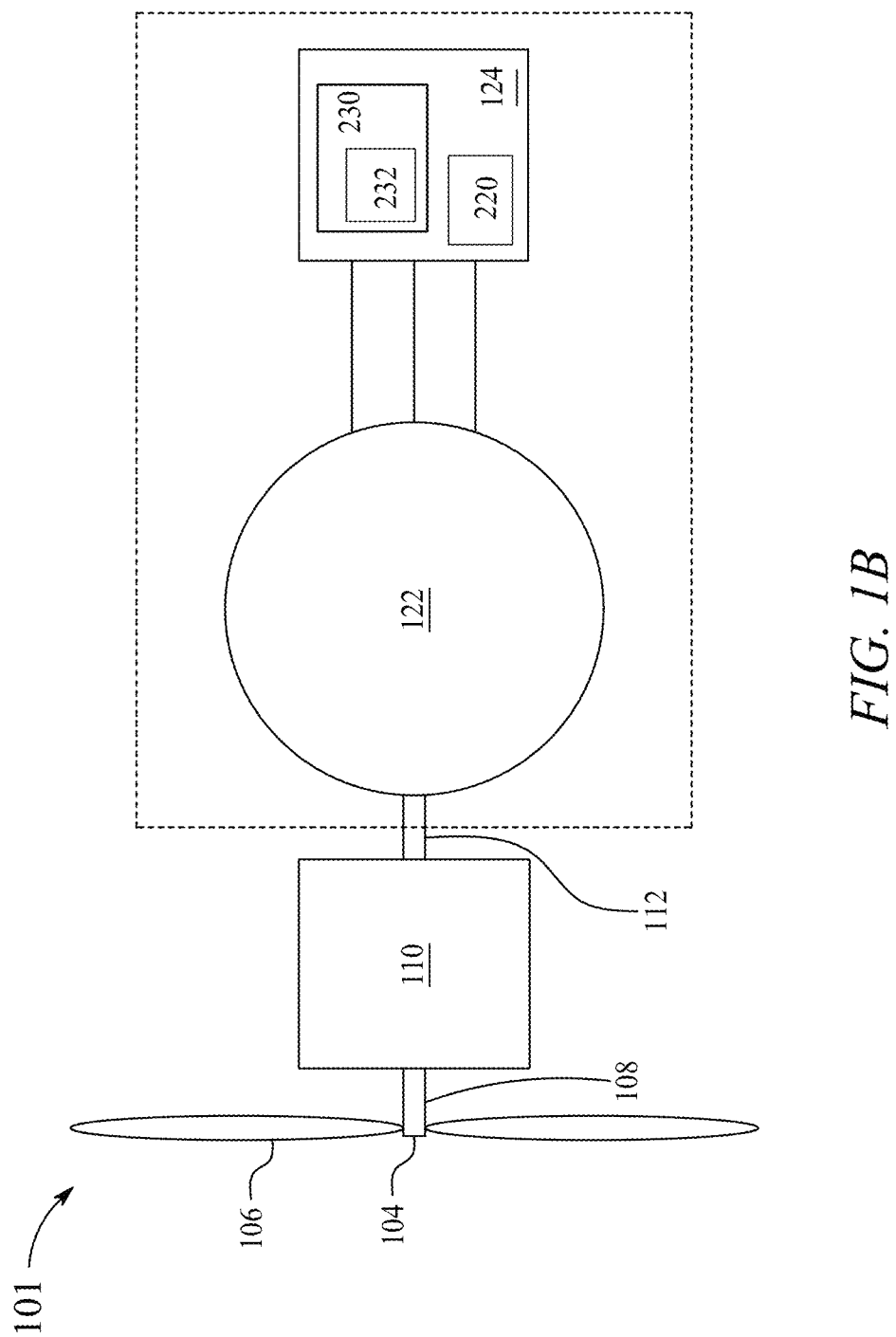
FIG. 1B is a schematic diagram of the wind energy system in which a wind turbine is associated with a wind turbine control apparatus, according to certain embodiments. This diagram includes a processor, a memory within the controller as well as a machine learning neural network stored within the controller memory.

FIG. 1B is a schematic diagram that includes the previously described gearbox 110, high-speed shaft 112, generator 122 as well as more details of the controller module 124. As shown by the diagram in FIG. 1B, the controller module 124 includes one or more processors 220 as well as a memory 230. Included in the memory 230 is the data structure of the neural network model 232 of this disclosure. The data structures of the neural network model are modified by the neural network training methods of this disclosure.

The blades 106 of the wind turbine 101 may capture the kinetic energy (KE) in the wind and translate it into rotational mechanical energy of the rotor 104, which in turn is converted into electrical energy by the generator 122 using the drive train 102. The KE of the moving air is:

$$KE = \frac{1}{2}\rho A V_w^3 \text{(Watts)} \tag{1}$$

where, ρ is an air density, $V_w$ is wind velocity (also referred to as "wind speed" for purposes of the present disclosure)

and A is blade swept area. Herein, the air density (ρ) and the wind velocity ($V_w$) are external factors; and the blade swept area (A) is the area through which the blades 106 of the rotor 104 of the wind turbine 101 spin, as seen when directly facing the center of the rotor 104. For example, a wind turbine 101 with radius 4.5 meters (the length of a single blade being the radius of the turbine) would have a wind swept area of π (radius)$^2$=3.14×20.25=63.585 m$^2$. As may be understood, the expression in equation (1) clearly shows that as the wind velocity ($V_w$) increases, the KE increases cubic times because of the cubic function of the wind velocity ($V_w$).

From the above equation (1) above, the aerodynamic mechanical power ($P_m$) for the wind turbine is given by:

$$P_m = \frac{1}{2}\rho A V_w^3 C_p(\lambda, \beta) \tag{2}$$

where, $C_p$ is a power coefficient which is depicted by function of (λ,β) with λ being tip speed ratio and $C_p$ being blade pitch angle. Herein, the tip speed ratio (λ) also referred to as TSR is a ratio between the wind speed and the speed of tips of the blades 106 of the wind turbine 101; and the blade pitch angle (β), often shortened to pitch, refers to the angle between a chord line of the blade 106 and a plane of rotation of the rotor 104 in the wind turbine 101.

Further, as may be contemplated by a person skilled in the art, the relationship between the tip speed ratio (λ) and angular rotor speed ($\Omega_r$) (in rad/sec) for the rotor 104 of the wind turbine 101 is given as:

$$\lambda = \frac{\omega_r R}{V_w} \tag{3}$$

where, R is radius of the wind turbine rotor 104. It may be appreciated that larger radius of the wind turbine rotor 104 (R) allow the wind turbine 101 to sweep more area, and thereby capture more wind and produce more power output.

Furthermore, the power coefficient ($C_r$) being function of (λ,β) for the wind turbine 101 is evaluated as:

$$C_p(\lambda, \beta) = 0.22\left(\frac{116}{\lambda_i} - 0.4\beta - 5\right)e^{\frac{-12.5}{\lambda_i}} + 0.0068\lambda \tag{4}$$

and, the tip speed ratio (λ) is estimated as:

$$\frac{1}{\lambda_i} = \frac{1}{\lambda + 0.08\beta} - \frac{0.035}{\beta^3 + 1} \tag{5}$$

Also, the relationship between mechanical torque ($T_m$) and the aerodynamic mechanical power ($P_m$) is given as:

$$T_m = \frac{P_m}{\omega_r} \tag{6}$$

Now, maximum power ($P_{max}$) at any given wind speed is possible when maximum power coefficient ($C_{pmax}$) is achieved at optimal tip speed ratio ($\lambda_{opt}$). In particular, the maximum power coefficient ($C_{pmax}$) is achieved at the optimal tip speed ratio ($\lambda_{opt}$) with the blade pitch angle (β) being controlled only when the wind velocity ($V_w$) exceeds the rated wind speed to maintain the rated active power of the wind turbine 101 and otherwise is kept constant at β=0°. Herein, the maximum power ($P_{max}$) at any given wind speed is given as:

$$P_{max} = \frac{1}{2}\rho A V_w^3 C_{pmax}(\lambda, \beta) \tag{7}$$

Thereby, in the present embodiments, optimum rotor speed ($\omega_{opt}$) at the maximum power ($P_{max}$) for the wind turbine 101 is given by:

$$\omega_{opt} = \frac{\lambda_{opt} V_w}{R} \tag{8}$$

Figure 2:
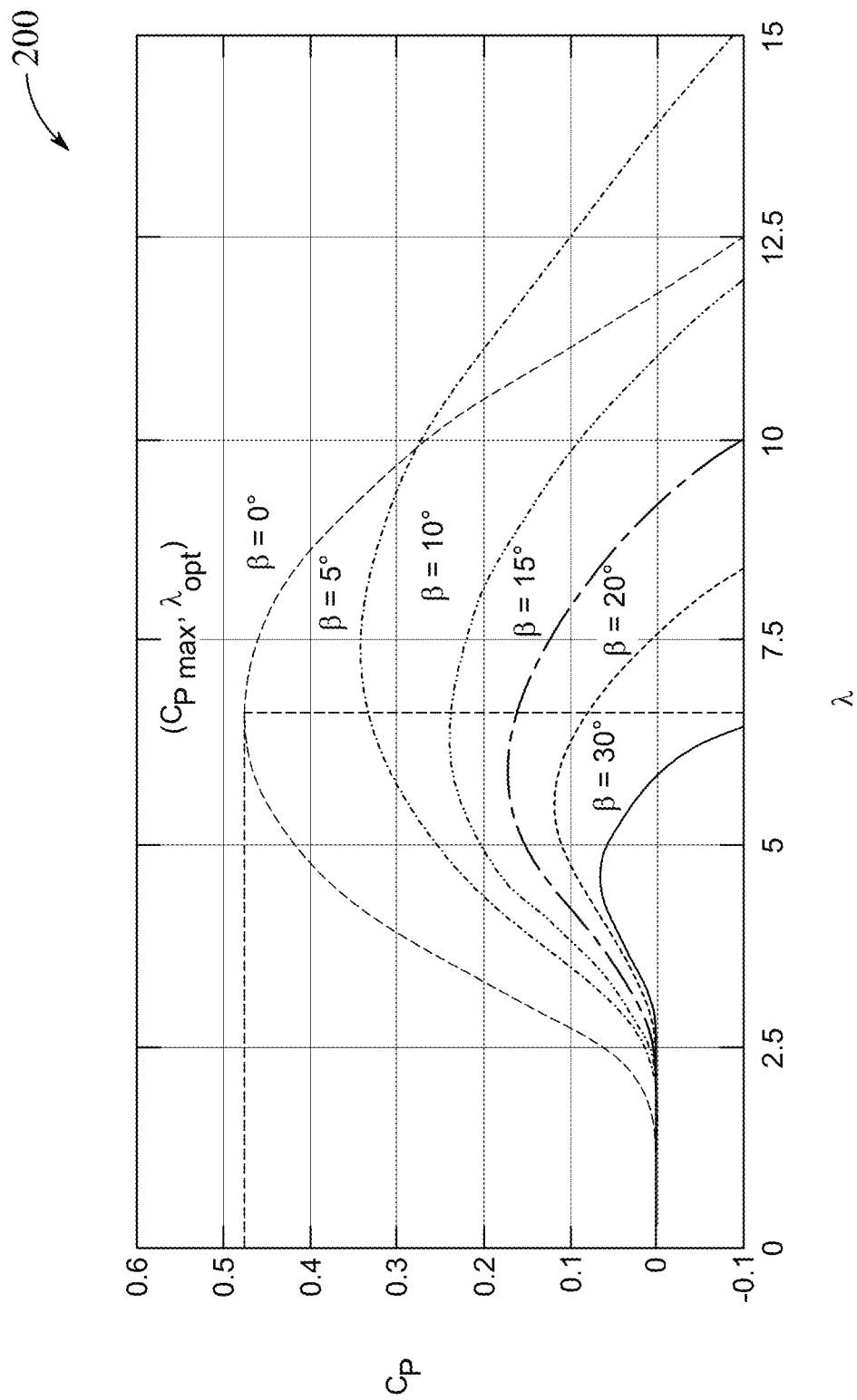
FIG. 2 is a graph depicting relationship between power coefficient and tip speed ratio for the wind turbine, according to certain embodiments.

Referring to FIG. 2, illustrated is a graph 200 depicting relationship between the power coefficient ($C_r$) and the tip speed ratio (λ) for the wind turbine 101. Specifically, the graph 200 shows $C_p$-λ characteristics for the different values of the blade pitch angle (β). From the graph 200, it may be observed that for a fixed blade pitch angle (β), the maximum power coefficient ($C_{pmax}$) is achieved when the tip speed ratio (λ) is at the optimal tip speed ratio ($\lambda_{opt}$). Further, as may be understood from equation (3), for a given wind velocity ($V_w$), to achieve the maximum power coefficient ($C_{pmax}$), the angular rotor speed ($\omega_r$) is needed to be maintained at the optimum rotor speed ($\omega_{opt}$). Therefore, it may be concluded that for achieving the maximum power coefficient ($C_{pmax}$), both the tip speed ratio (λ) and the angular rotor speed ($\omega_r$) need to be at respective optimal values, i.e., the optimal tip speed ratio ($\lambda_{opt}$) and the optimum rotor speed ($\omega_{opt}$) respectively.

Figure 3:
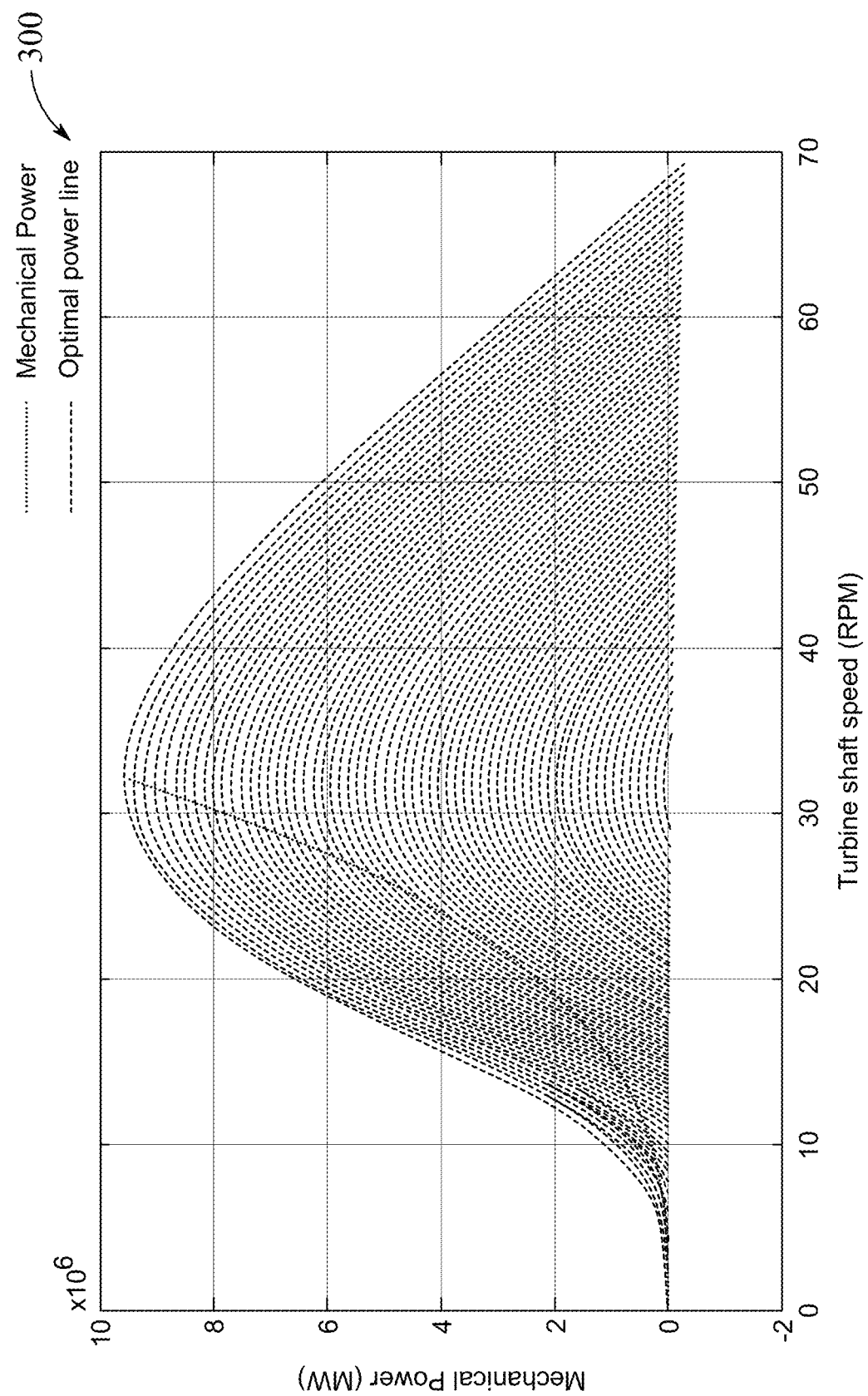
FIG. 3 is a graph depicting relationship between power generated by the wind turbine and rotor speed therefor, according to certain embodiments.

Also, as discussed, the mechanical power of the wind turbine is non-linear in nature due to intermittence of the wind speed. Referring to FIG. 3, illustrated is a graph 300 depicting relationship between the power generated by the wind turbine 101 and speed of the rotor 104 (also referred to as "rotor speed"), and showing an optimal power line at which the maximum power ($P_{max}$) is achieved for different wind speeds ranging from 3 m/s to 19.4 m/s. That is, in embodiments of the present disclosure, the wind turbine 101 achieves the maximum power output and the optimum reference angular speed for a fluctuating wind speed between 3 m/s and 19.4 m/s. Further, in some embodiments, the wind turbine control module 124 stops the wind turbine for wind speeds below 3 m/s and above 19.4 m/s. As may be seen from the graph 300, the maximum power ($P_{max}$) varies with the operating rotor speed; and since the rotor speed is sensitive to the wind speed, the maximum power ($P_{max}$) point keeps changing. Therefore, it may be understood that the maximum powers ($P_{max}$) are achieved at the different rotor speeds, and thus the rotor speed may need to be at the optimum rotor speed ($\omega_{ops}$). This technique to use the maximum energy available in the wind to achieve wind turbine 101 operation at the maximum power ($P_{max}$) is called as MPPT (Maximum Power Point Tracking) technique, which is discussed in more detail in the proceeding paragraphs.

In order to implement the MPPT technique, a model for the PMSG based wind turbine 101 needs to be developed. Herein, as the low speed shaft 108 is connected to the high speed shaft 112 via the gear box 110, therefore torque generated at the high speed shaft 112 near the PMSG 122 is given as $T_s$ operating at a speed given by $\omega_{ref}$. It may be noted that the PMSG 122 is connected to a current control pulse width modulation (PWM) inverter (not shown) for purposes of the present disclosure. The PMSG 122 is driven by the high speed shaft 112, as the entire dynamic model is implemented in dq-frame. The PMSG synchronous electrical model as given by the following equations:

$$\frac{di_{sd}}{dt} = -\frac{R_{sa}}{L_{sd}}i_{sd} + \omega_s \frac{L_{sq}}{L_{sd}}i_{sq} + \frac{1}{L_{sd}}V_{sd} \quad (9)$$

$$\frac{di_{sq}}{dt} = -\frac{R_{sa}}{L_{sq}}i_{sq} - \omega_s \left(\frac{L_{sd}}{L_{sq}}i_{sd} + \frac{1}{L_{sq}}\psi_p\right) + \frac{1}{L_{sq}}V_{sq} \quad (10)$$

$$T_e = \frac{3}{2} * \frac{P}{2}[\psi_p i_{sq} + i_{sd}i_{sq}(L_{sd} - L_{sq})] \quad (11)$$

where, $V_{sd}$, $V_{sq}$, $I_{sd}$ and $I_{sq}$ represent d-q axis stator voltages and currents, respectively; $L_{sd}$ and $L_{sq}$ represent inductances of the generator 122; P represents number of poles; $\psi_p$ represents permanent flux, $R_{sa}$ represents stator resistance; $\omega_s$ represents generator's electrical angular frequency; and $T_e$ represents electromagnetic torque.

Continuing with FIG. 1B, the wind turbine 101 is associated with the wind turbine control module 124. The wind turbine control module 124 includes a generator 122 connected to the wind turbine 101. In particular, as shown, the generator 122 is connected to the high speed shaft 112 of the drive train 102. In one or more embodiments of the present disclosure, the generator 122 is a Permanent Magnet Synchronous Generator (PMSG), with the two terms being interchangeably used. Thereby, in the present disclosure, the wind turbine 101 has sometimes been referred to as "PMSG based wind turbine" without any limitations. Herein, the PMSG 122 is utilized for the wind turbine control module 124 due to its properties of self-excitation and of low speed which result in direct-drive wind energy conversion system (WECS), leading to costs and mechanical complexities of gear boxes being avoided. The PMSG 122 also has advantages of high efficiency and reliability since external excitation and conductor losses are removed from the rotor 104 of the wind turbine 101.

Further, as illustrated in FIG. 1B, the wind turbine control module 124 includes a controller module 124. The controller module 124 may be implemented in hardware, firmware or software, or some combination of at least two of the same. It should be noted that the functionality associated with the controller module 124 may be centralized or distributed, whether locally or remotely. The controller module 124 may include a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the controller module 124 may include a memory in form of one or more non-transitory computer-readable storage media that can be read or accessed by other components thereof. The memory may be any computer-readable storage media, including volatile and/or non-volatile storage components, such as optical, magnetic, organic, or other memory or disc storage, which can be integrated in whole or in part with the device. In some examples, the memory may be implemented using a single physical device (e.g., optical, magnetic, organic, or other memory or disc storage unit), while in other embodiments, the memory may be implemented using two or more physical devices without any limitations.

The controller module 124 is configured to implement a machine learning neural network model (as represented by block 232); hereinafter, sometimes referred to as "neural network (NN) model" or "artificial neural network (ANN)" without any limitations. The machine learning neural network 232 is implemented to execute a machine learning neural network method. In particular, the controller module 124 is configured to implement the machine learning neural network method considering the wind speed ($V_w$), as well as blade pitch angle ($\beta$), tip speed ratio ($\lambda$), radius of a wind turbine rotor (R), air density ($\rho$), maximum power coefficient ($C_{pmax}$), optimum tip speed (or optimal tip speed ratio ($\lambda_{opt}$)), maximum power ($P_{max}$), gear ratio, stator phase resistance and armature inductance as input, and output a maximum power ($P_{max}$) at varying wind speeds and a reference angular speed (i.e., optimum rotor speed ($\omega_{opt}$)) at varying wind speeds. It may be understood that, herein, the gear ratio is the gear ratio of the gear box 110; and the stator phase resistance and the armature inductance may be fixed properties of the generator 122 (as may be obtained from specification thereof).

The machine learning neural network 232 is developed by a series of algorithms that endeavors to recognize underlying relationships in a set of data through a process that mimics the way the human brain operates. The ANN 232 is an intelligent technique that evolved with the concept of biological neurons to perform complex computation. The ANN 232 has an ability to train from any data which is based on parallel processing by iteratively tuning of weights. In particular, a set of inputs is by means of weighting function is provided to hidden layer and then to output layer. The initial weight may be selected randomly by selecting maximum and minimum value of input. During the process of training, the weights are continuously updated for $i^{th}$ neuron. The weight equation is given in equation (12) below. Once the network is trained, then by subjecting any input the ANN can estimate the output accordingly with minimum error.

$$w_{ij}(t+1) = w_{ij}(t) + \eta\left(\frac{\partial E_m}{\partial w_{ij}(t)}\right) \quad (12)$$

The implementation of the NN model 232 generally involves four major steps as listed below:
  i. Data generation: This is the primary step that involves the generation of offline data for a system with selected inputs and outputs to train the NN model 232.
  ii. Input/output selection: After data generation, candidate variables of the NN model 232 for input and output are selected based on the requirements of the present disclosure.
  iii. ANN architecture selection: Further, an architecture for the NN model 232 to be implemented may be selected depending on the requirements of the present disclosure, such as, but not limited to, Feed forward back propagation (FFBP) ANN and Radial basis function ANN.
  iv. ANN training and testing: Upon selection of the algorithm, the weights are determined to reduce or minimize the errors such as mean square error (MSE) or sum of squared errors (SSE). The selected inputs and outputs are provided to train the NN model 1232 thus modifying the NN model 232 data structure stored in the controller memory 230 After training, the NN model 232 is subjected to produce the outputs based on the selected test inputs.

Figure 4:
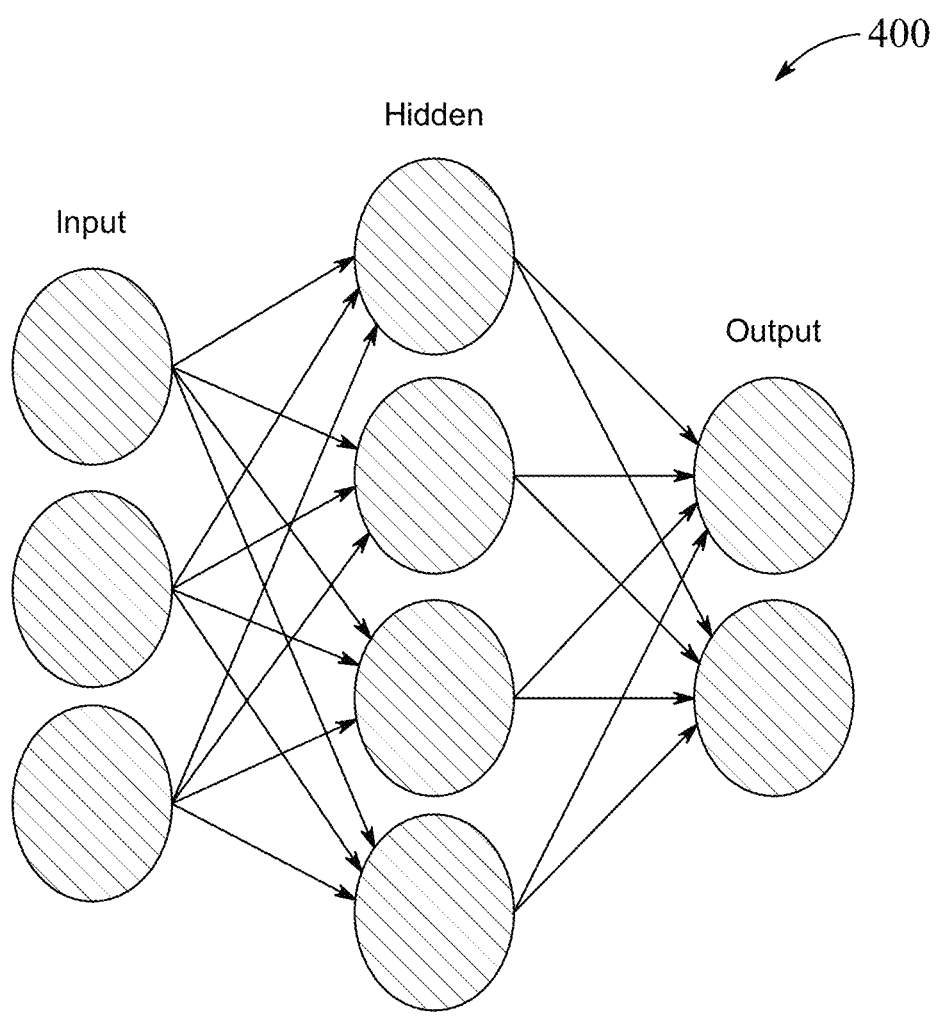
FIG. 4 is a schematic representation of a feed forward back propagation (FFBP) model used in training of neural network for controlling operations of the wind turbine, according to certain embodiments.

In one or more embodiments, the feed forward back propagation (FFBP) method is used in the training of the neural network model 232. Referring to FIG. 4, illustrated is a schematic representation of an FFBP model (represented by reference numeral 400). The FFBP algorithm is widely used from available architectures of the NN model 232 where the data moves in one forward direction. The FFBP model 400 performs learning on a multilayer feed-forward neural network. As shown, the FFBP model 400 is a multilayer feed-forward neural network which consists of an input layer, one or more hidden layers, and an output layer. As known in the art, the FFBP model 400 iteratively learns a set of weights for prediction of the class label of tuples. In other embodiments, the radial basis function (RBF) method is used in the training of the neural network model 232 without departing from the spirit and the scope of the present disclosure. The RBF method is the process of finding the values of centroids, widths, weights, and biases; and the computed output of the RBF method depends on the input values, and the values of the centroids, the widths, the weights, and the biases.

As discussed, the present wind energy system 100 is formed by coupling the PMSG 122 with the wind turbine 101. The control strategy for the present wind energy system 100 with the PMSG 122 is performed by implementing the following steps:

Generating data set
NN training for WECS
Testing of wind turbine NN model
Speed control of wind energy PMSG system Herein, the value(s) or range(s) for the given parameters that may be utilized are listed in Table 1 below.

TABLE 1

| Control Parameters | |
| --- | --- |
| Wind Turbine Parameters | |
| Wind speed range ($V_w$) | 3 to 19.4 m/s |
| Blade pitch angle ($\beta$) | 0 |
| Tip speed ratio ($\lambda$) | 0.1~14 |
| Radius of the wind turbine rotor (R) | 37.5 m |
| Air density ($\rho$) | 1.225 kg/m³ |
| Maximum power coefficient ($C_{pmax}$) | 0.4818 |
| Optimum tip speed ratio ($\lambda_{opt}$) | 6.5 |
| Maximum power ($P_{max}$) @ 19.4 m/s | 9.5 MW |
| Gear ratio | 75 |
| PMSG parameters | |
| Stator phase resistance ($R_{sa}$) | 2.875 Ω |
| Armature inductance (H) | 0.00153 |
| Simulation Parameters | |
| Operating wind speed | 4-13 m/s |
| Sampling time | 2 µs. |

Figure 5:
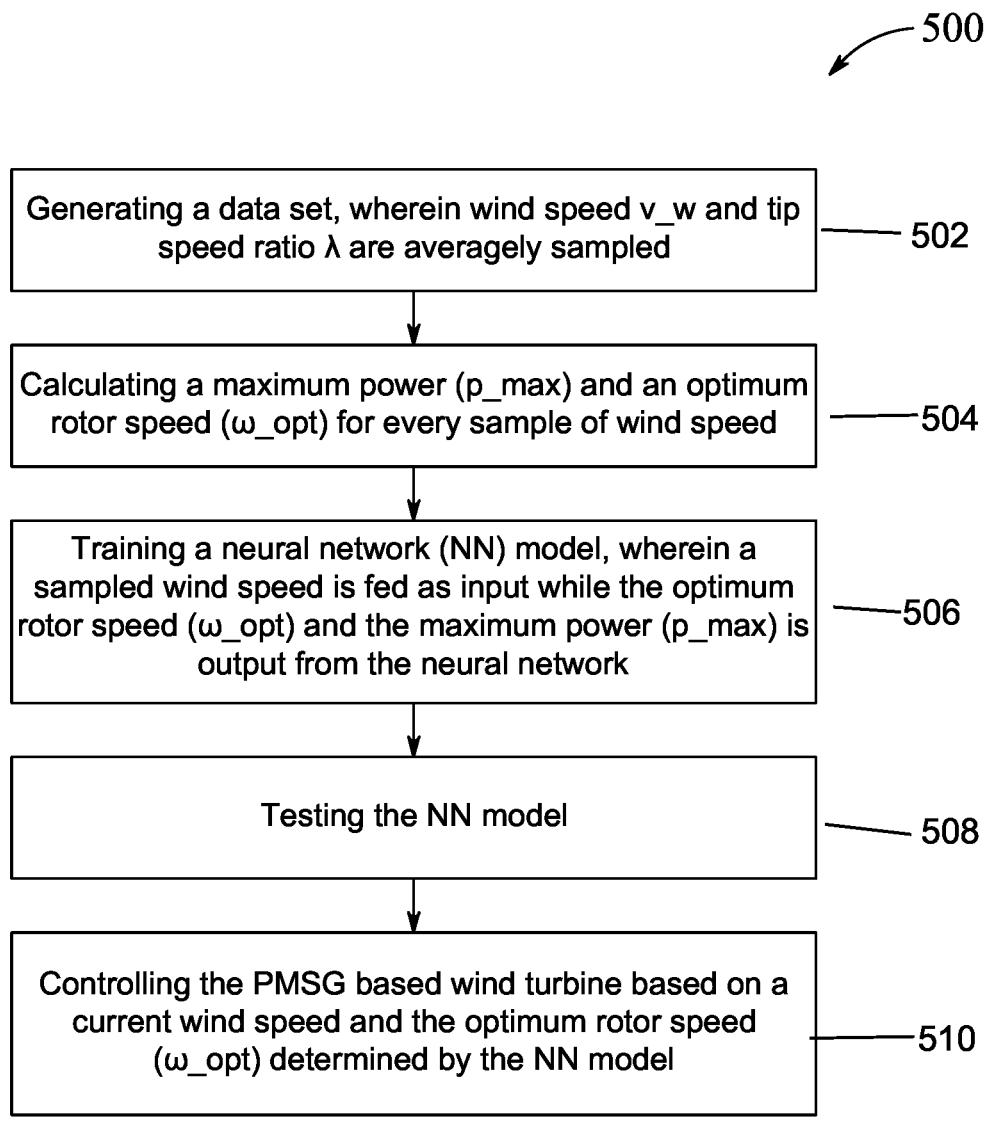
FIG. 5 is a flowchart of a wind energy control method for the wind turbine, according to certain embodiments.

Referring to FIG. 5, illustrated is a flowchart of a wind energy control method 500 (hereinafter, sometimes referred to as "method 500") for the Permanent Magnet Synchronous Generator (PMSG) based wind turbine (such as, the wind turbine 101), in accordance with embodiments of the present disclosure. The various embodiments and variants disclosed above apply mutatis mutandis to the present method 500 without any limitations. Further, it may be appreciated that the steps described in reference to the method 500 are only illustrative, and other alternatives may also be provided where one or more steps are re-ordered, one or more steps are added, or one or more steps are removed without departing from the spirit and the scope of the present disclosure.

At step 502, the method 500 includes generating a data set, wherein the wind speed and the tip speed ratio are averagely sampled. In an example embodiment, the wind speed ($V_w$) and the tip speed ratio ($\lambda$) are averagely sampled with 140 samples each, respectively. The range for the wind speed and the tip speed ratio are mentioned in Table 1 as provided above. Herein, the maximum power coefficient is achieved when the blade pitch angle ($\beta$) is set to zero (as discussed above).

At step 504, the method 500 includes calculating the maximum power ($P_{max}$) and the optimum rotor speed ($\omega_{opt}$) for every sample of wind speed. From the equations (2) and (3) above, the mechanical power ($P_m$) and the turbine rotational speed ($\omega_r$) are evaluated for each sample of wind speed. This generates a data set with a matrix 140 by 140 (or 19600) samples. Herein, each row corresponds to the mechanical power produced at one wind speed with 140 samples of the tip speed ratio. From each row, maximum value is selected as the maximum power ($P_{max}$) and the optimum rotor speed ($\omega_{opt}$) for every sample of wind speed.

Figure 6:
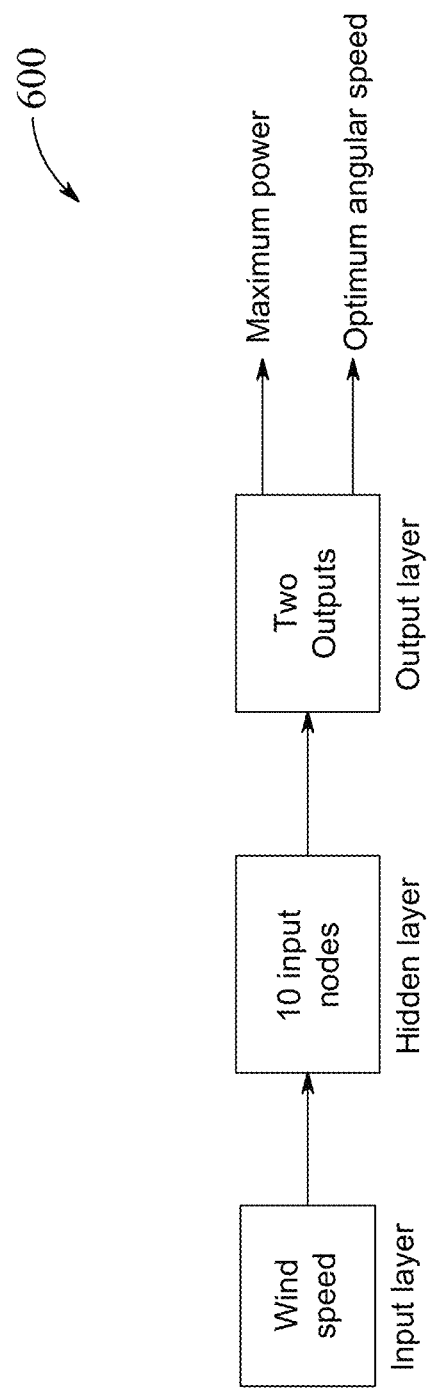
FIG. 6 is a schematic representation of training of the neural network, according to certain embodiments.

At step 506, the method 500 includes training the neural network (NN) model (such as, the NN model 232), wherein a sampled wind speed is fed as input while the optimum rotor speed ($\omega_{opt}$) and the maximum power ($P_{max}$) are output from the neural network 232. That is, the NN model 232 is trained to obtain the optimum rotor speed ($\omega_{opt}$) and the maximum power ($P_{max}$) from the wind energy system 100 based on the input wind speed. In an embodiment, the feed forward back propagation method is used in the training of the neural network model 232. That is, the NN model 232 is trained by using backpropagation algorithm (e.g., the FFBP model 400, as described above). In another embodiment, the radial basis function method is used in the training of the neural network model 232. The generated data set for wind is used as input to the NN model 232, and the data set generated for the maximum power ($P_{max}$) and the optimum rotor speed ($\omega_{opt}$) is selected as target output. Referring to FIG. 6, illustrated is a schematic representation (represented by reference numeral 600) of training of the NN model 232 with one input and two outputs. In an example, the training is performed with 10 neurons based on the one input and two output dataset. The wind speed is fed as input while the optimum rotor speed ($\omega_{opt}$) and the maximum power ($P_{max}$) is fed as output to the network.

Figure 7:
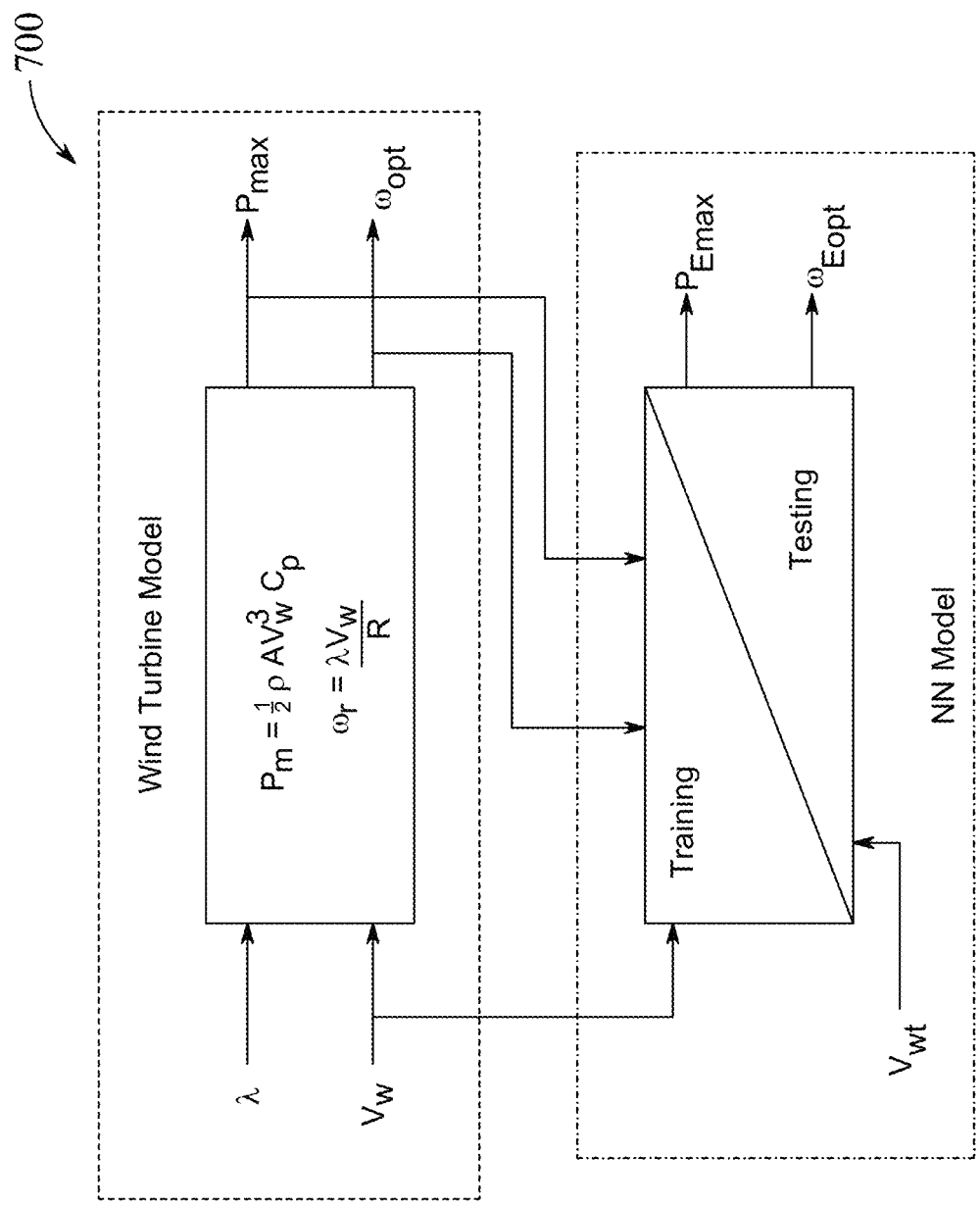
FIG. 7 is a schematic representation of the neural network working in conjunction with a wind turbine model for training thereof, according to certain embodiments.

At step 508, the method 500 includes testing the NN model 232. Referring to FIG. 7, illustrated is a schematic representation (represented by reference numeral 700) of the NN model 232 working in conjunction with the wind turbine model for training thereof. As may be seen, the wind turbine model (as described above) uses the wind speed ($V_w$) and the tip speed ratio ($\lambda$) as inputs to provide the optimum rotor speed ($\omega_{opt}$) and the maximum power ($P_{max}$) as outputs. These outputs (i.e., the optimum rotor speed ($\omega_{opt}$) and the maximum power ($P_{max}$)) are fed to the NN model 232 along with the wind speed ($V_w$) value for training thereof. In testing of the NN model 232, a test wind speed value ($V_{wt}$) may be fed to the NN model 232, which generates the exemplary optimum rotor speed ($\omega_{Eopt}$) and the exemplary maximum power ($P_{Emax}$) as outputs. These exemplary values may be tested to confirm that the NN model 232 is capable to achieve MPPT for the WECS 100.

Figure 8:
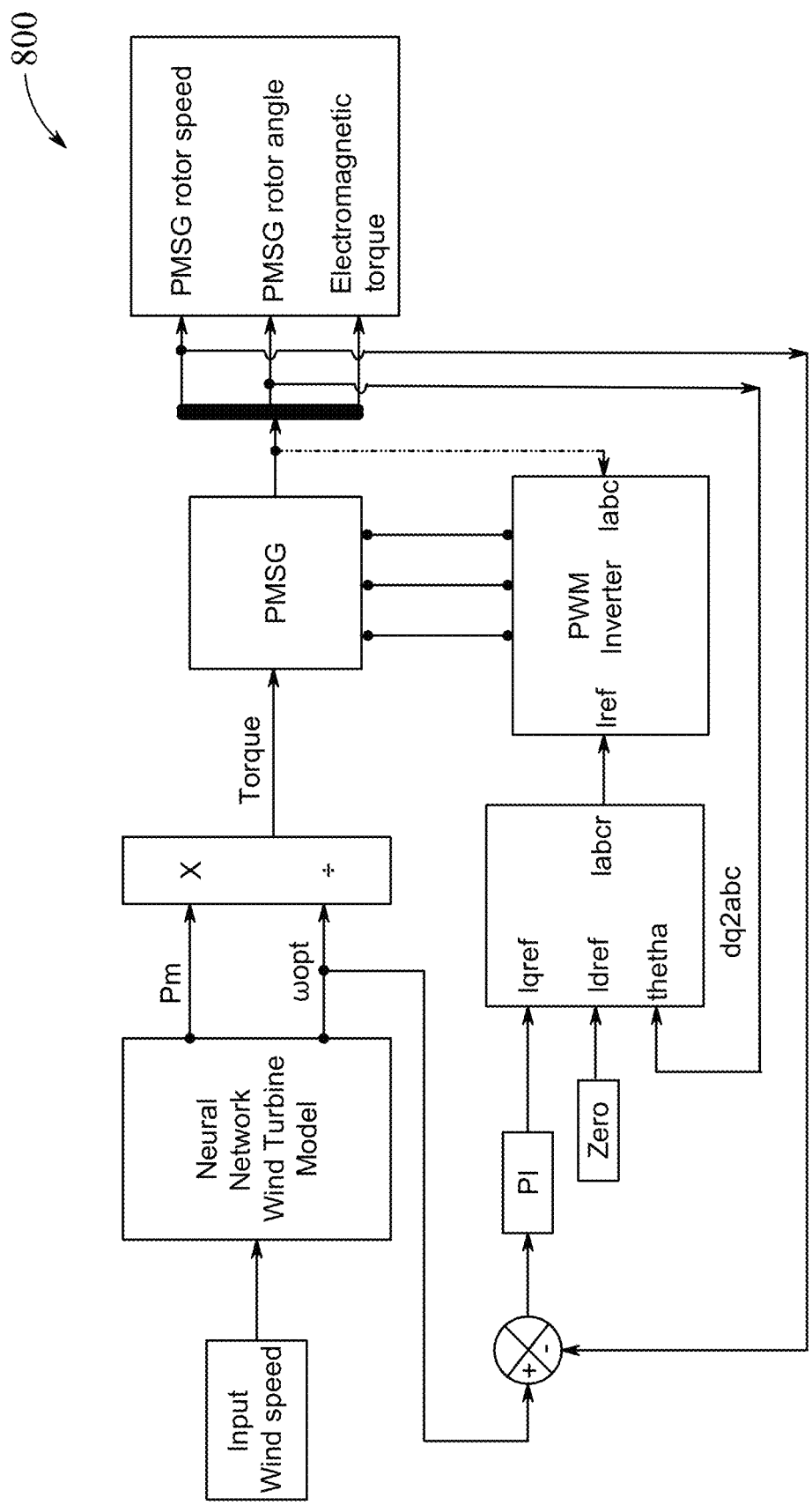
FIG. 8 is a schematic representation of a control strategy and model for the wind turbine, according to certain embodiments.

At step 510, the method 500 includes controlling the PMSG based wind turbine 101 based on a current wind speed and the optimum rotor speed ($\omega_{opt}$) determined by the NN model 232. In the present embodiments, the wind turbine control module 124 drives the wind turbine 101 based on the maximum power ($P_{max}$) or the reference angular speed (i.e., the optimum rotor speed ($\omega_{opt}$)) at varying wind speeds generated by the machine learning neural network method (as described above). For the speed control purposes, a control algorithm along with a power converter (PWM inverter, not shown) is implemented. Referring to FIG. 8, illustrated is a schematic representation (represented by reference numeral 800) of a proposed control strategy and model for the present variable speed PMSG based wind turbine 101. Herein, the mechanical torque ($T_m$) is estimated utilizing the equation (6) (as described above) from the wind turbine model and is measured in N-m. As would be understood, the mechanical torque of the high speed shaft 112 ($T_s$) (i.e., after the gear box 110 mechanism) is provided as input to the PMSG 122, based on which the PMSG 122 outputs angular rotor speed ($\omega_{PMSG}$) and electromagnetic torque ($T_e$). In the present disclosure, speed control method for the wind energy system 100 with the PMSG 122 is modelled completely in d-q frame. Specifically, two separate control loops are modelled, one inner loop for controlling the stator current and second loop for controlling the rotor speed. The optimum rotor speed ($\omega_{opt}$) from the high speed shaft 112 (after the gear box 110 mechanism) is used to generate reference angular speed ($\omega_{ref}$) to feed the PMSG based wind turbine 101 by using the controller module 124.

The controller module 124 may be implemented in the form of a PI (Proportional Integral) controller (with the two terms being interchangeably used), which corrects for error between the commanded set-point and the actual value based on some type of feedback. Herein, the PI controller 124 is fed by the error $\Delta\omega=\omega_{ref}-\omega_{PMSG}$ between the reference angular speed ($\omega_{ref}$) and the PMSG output angular rotor speed ($\omega_{PMSG}$). With respect to the error in speed, the PI controller 124 generates q-axis current ($i_{qref}$), while d-axis current a ($i_{dref}$) is set to zero as d-axis current control is adapted. This is implemented in order to control the grid side rectifier through the PI controller 124. Further, stator current ($i_{abc}$) from the PMSG 122 is fed back to the PWM inverter and is compared with the reference current ($i_{abcr}$). It may be contemplated that the electromagnetic torque ($T_a$) may have a noisy behavior due to the presence of noise in the stator current.

Experimental Data

Figure 9:
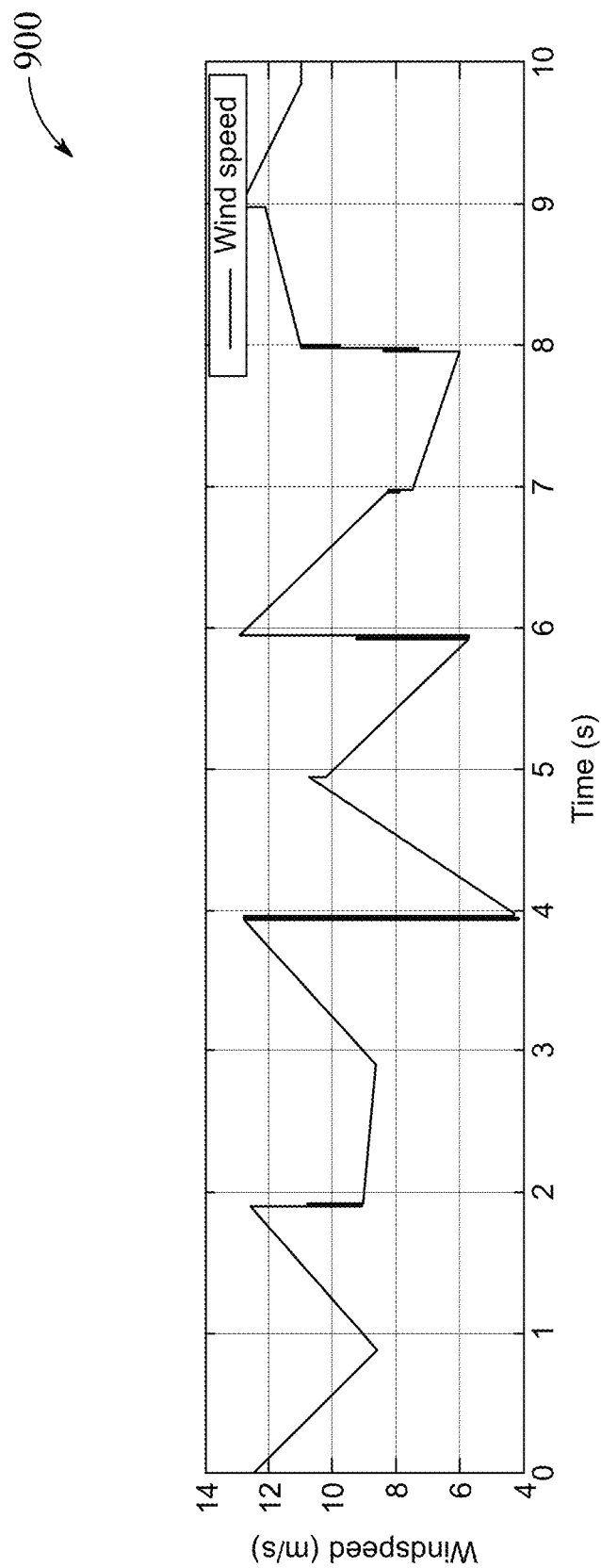
FIG. 9 is an exemplary graph depicting relationship between input varying wind speed with respect to time, according to certain embodiments.

The PMSG based wind turbine 101 was designed and simulated in MATLAB/Simulink environment using the parameters in Table 1 above. FIG. 9 is an exemplary graph 900 depicting relationship between input varying wind speed with respect to time. In the present example, the NN based control for the wind energy system 100 was simulated for 10 seconds, with varying input wind speed ranges between 4-13 m/s (as shown in the graph 900 of FIG. 9). Further, the sampling time used during the simulation is 2 microseconds (μs).

Figure 10:
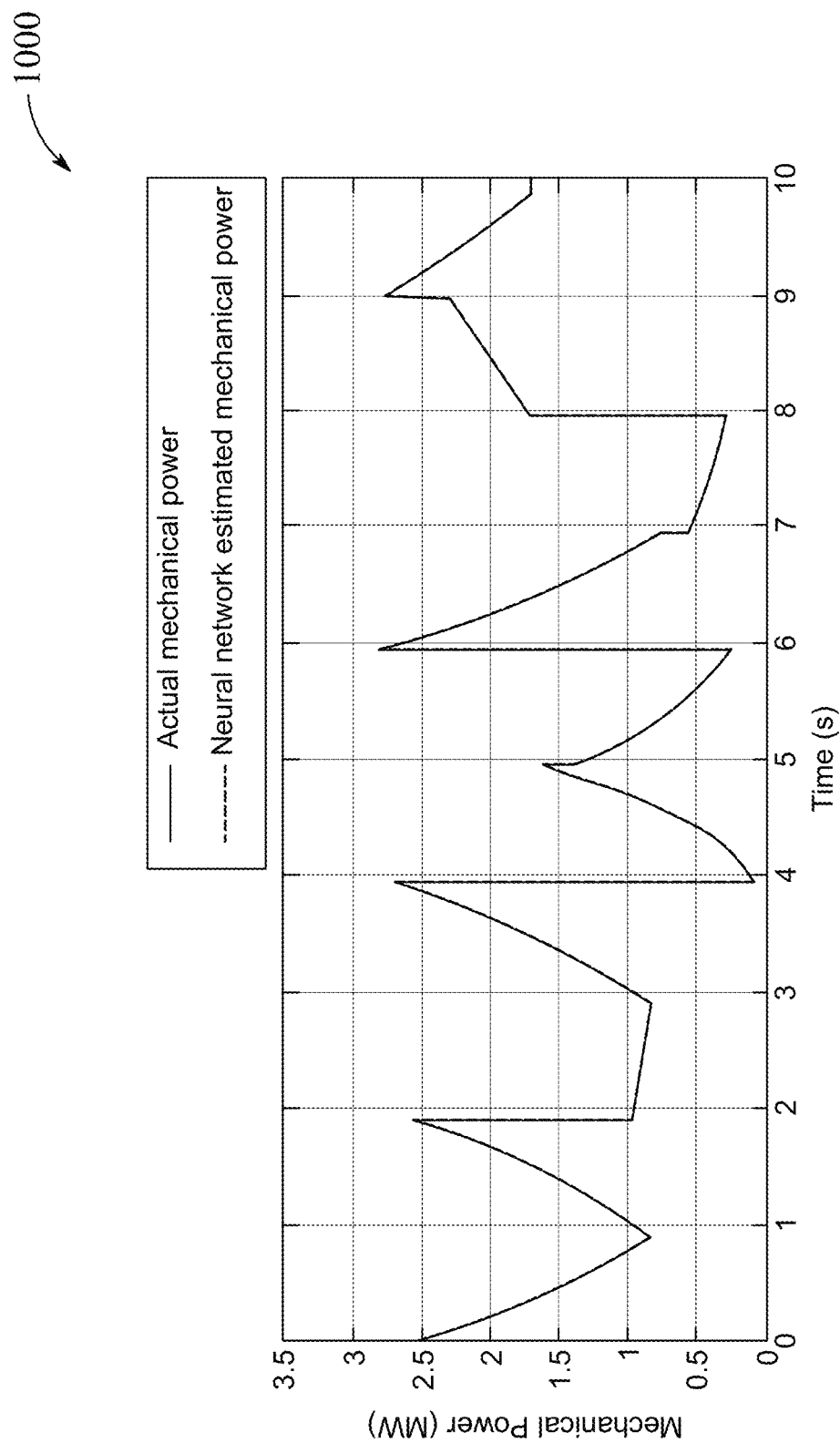
FIG. 10 is an exemplary graph depicting relationship between calculated actual mechanical power versus estimated mechanical power by the neural network, according to certain embodiments.
Figure 11:
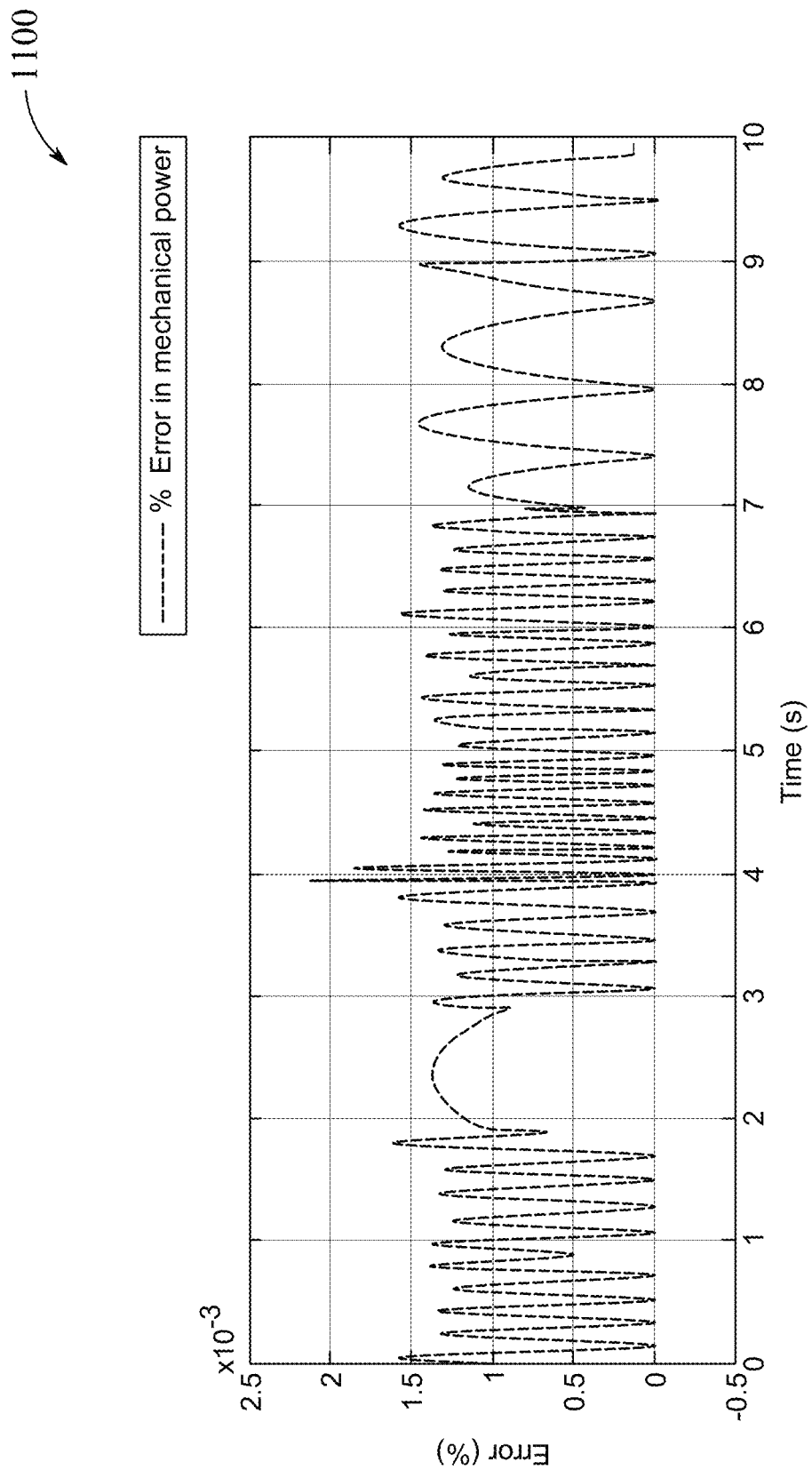
FIG. 11 is an exemplary graph depicting error between calculated actual power and estimated power, according to certain embodiments.

Further, a performance test of the wind energy system 100 under random varying input wind speed was performed. Herein, the NN model 232 for MPPT was adopted and tested under varying input wind speed. Referring to FIG. 10, illustrated is an exemplary graph 1000 depicting relationship between calculated actual mechanical power versus estimated mechanical power by the NN model 232. The graph 1000 shows the effectiveness of the proposed MPPT method based on the present NN model 232 by following, generally, the exact same pattern of that of calculated mechanical power. That is, the present NN model 232 successfully estimated the maximum power for each wind speed. Referring to FIG. 11, illustrated is an exemplary graph 1100 depicting error between calculated actual power and estimated power. As evident from the graph 1100, the error between tracked power by the NN model 232 and the actual power is less than 0.0025%. This confirms the accuracy of the present MPPT method implementing the proposed NN model 232.

Figure 12:
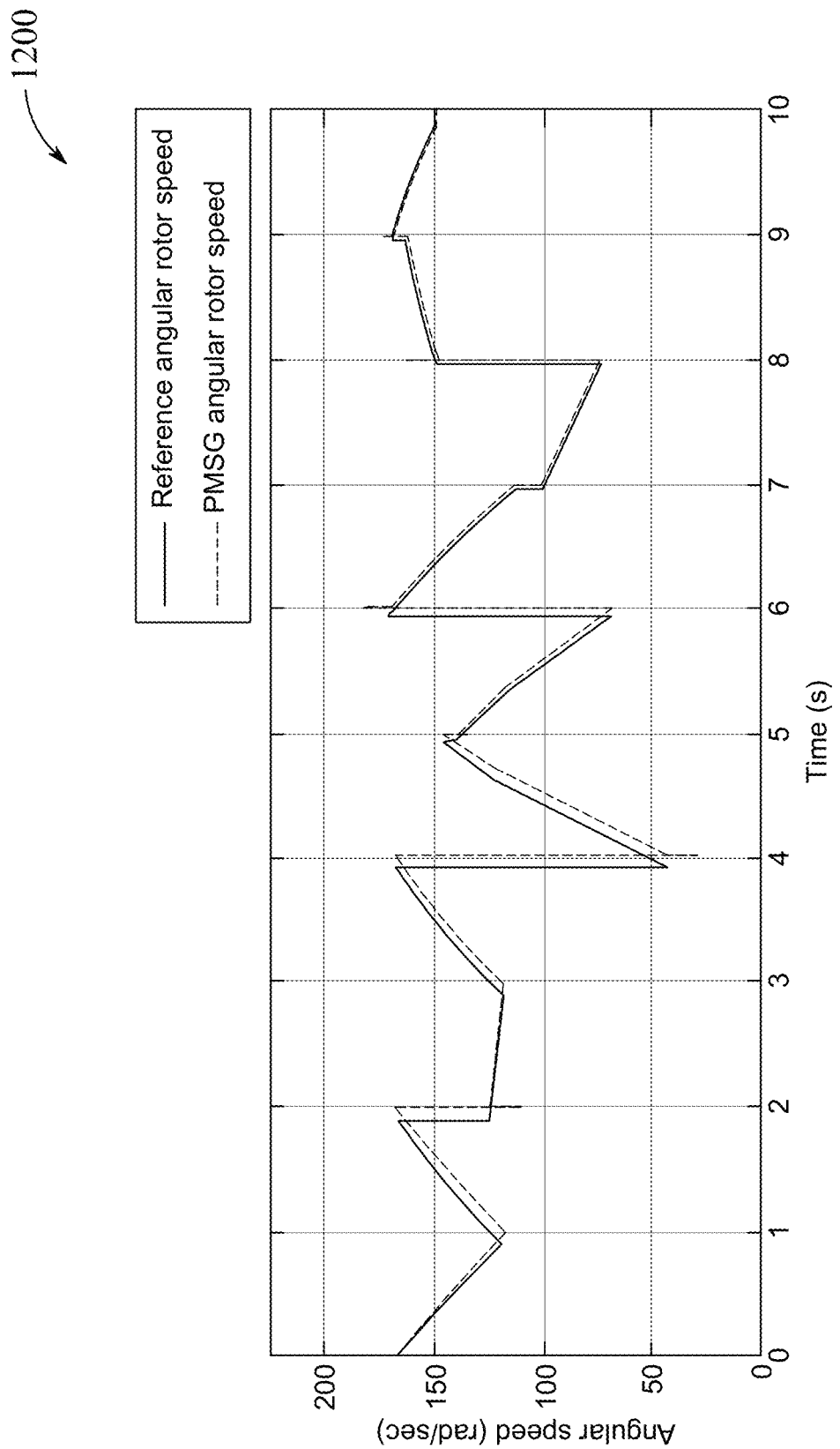
FIG. 12 is an exemplary graph depicting relationship between reference angular shaft speed and output rotor speed versus time, according to certain embodiments.

Furthermore, based on the control strategy implemented as described in the preceding paragraphs, simulation is also performed to investigate the performance of the PMSG control based on the NN model 232 for the wind energy system 100. Referring to FIG. 12, illustrated is an exemplary graph 1200 depicting relationship between reference angular shaft speed and PMSG output rotor speed versus time. As seen from the graph 1200, the PMSG angular rotor speed follows the reference angular rotor speed efficiently. In particular, both the PMSG angular rotor speed and the reference angular rotor speed, generally correspondingly, follow the variation of the input wind speed.

Figure 13:
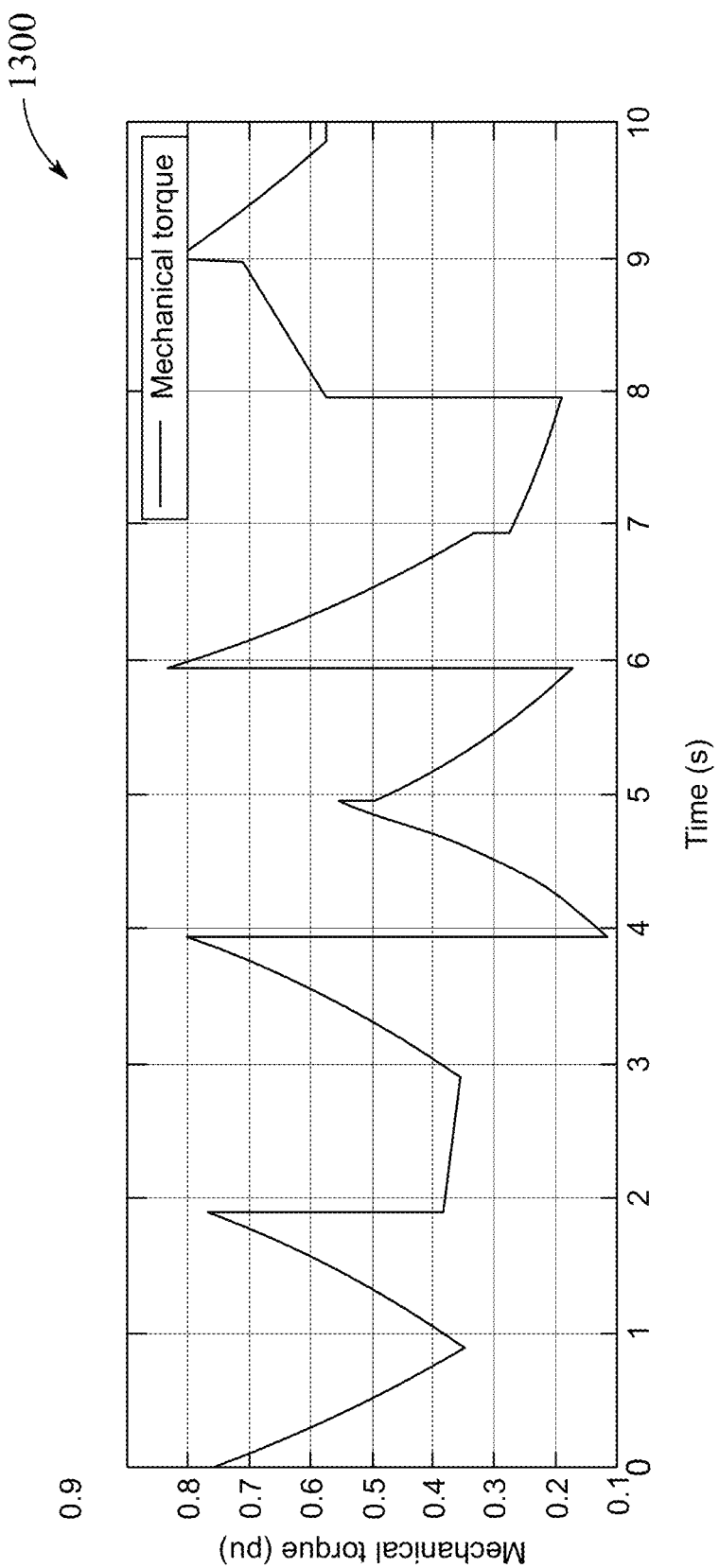
FIG. 13 is an exemplary graph depicting relationship between input mechanical torque to response of the wind turbine subjected to variation in wind speed, according to certain embodiments.
Figure 14:
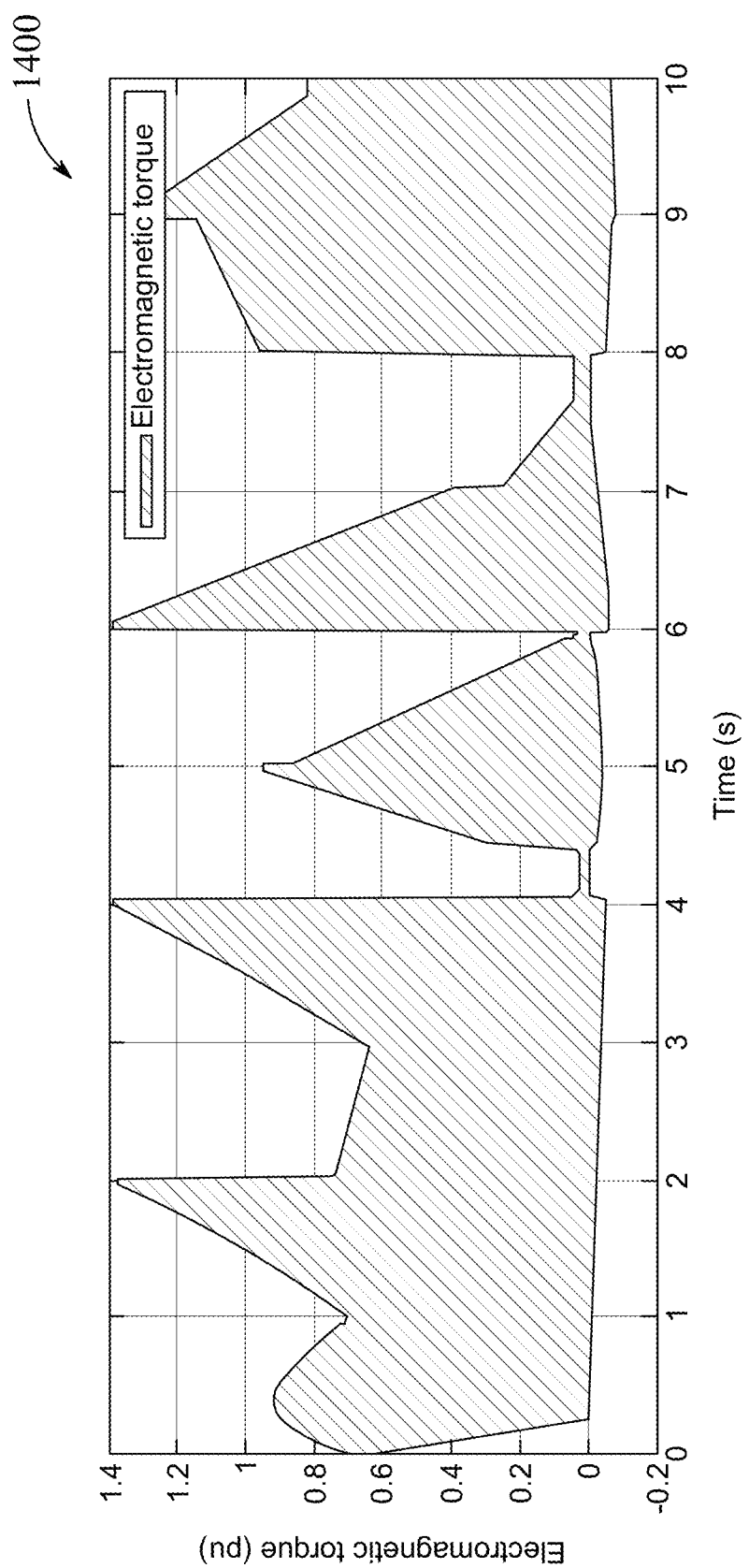
FIG. 14 is an exemplary graph depicting response of electromagnetic torque of the wind turbine subjected to wind speed, according to certain embodiments.
Figure 15:
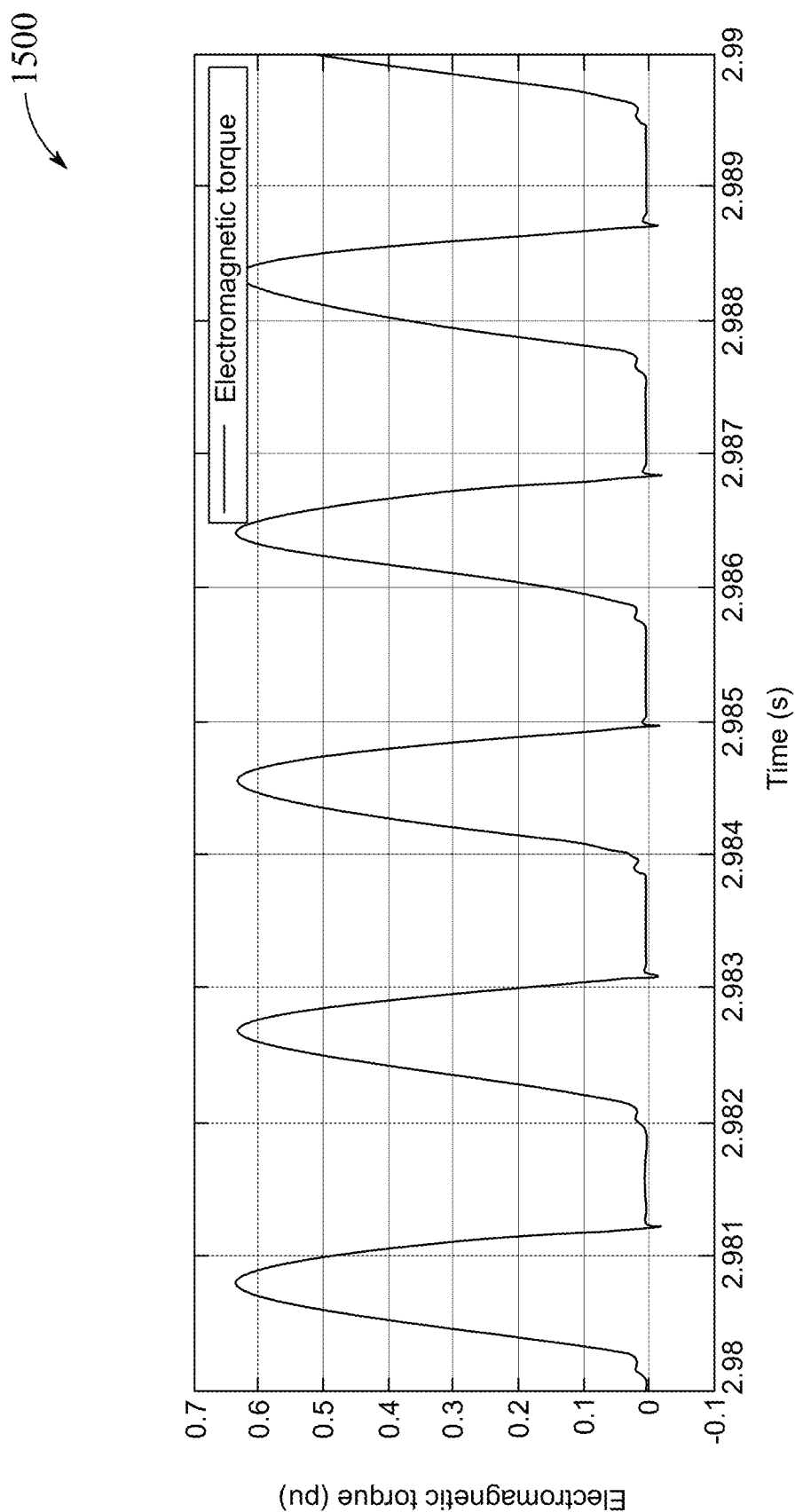
FIG. 15 is an exemplary graph depicting zoomed view of electromagnetic torque of the graph of FIG. 14, according to certain embodiments.
Figure 16A:
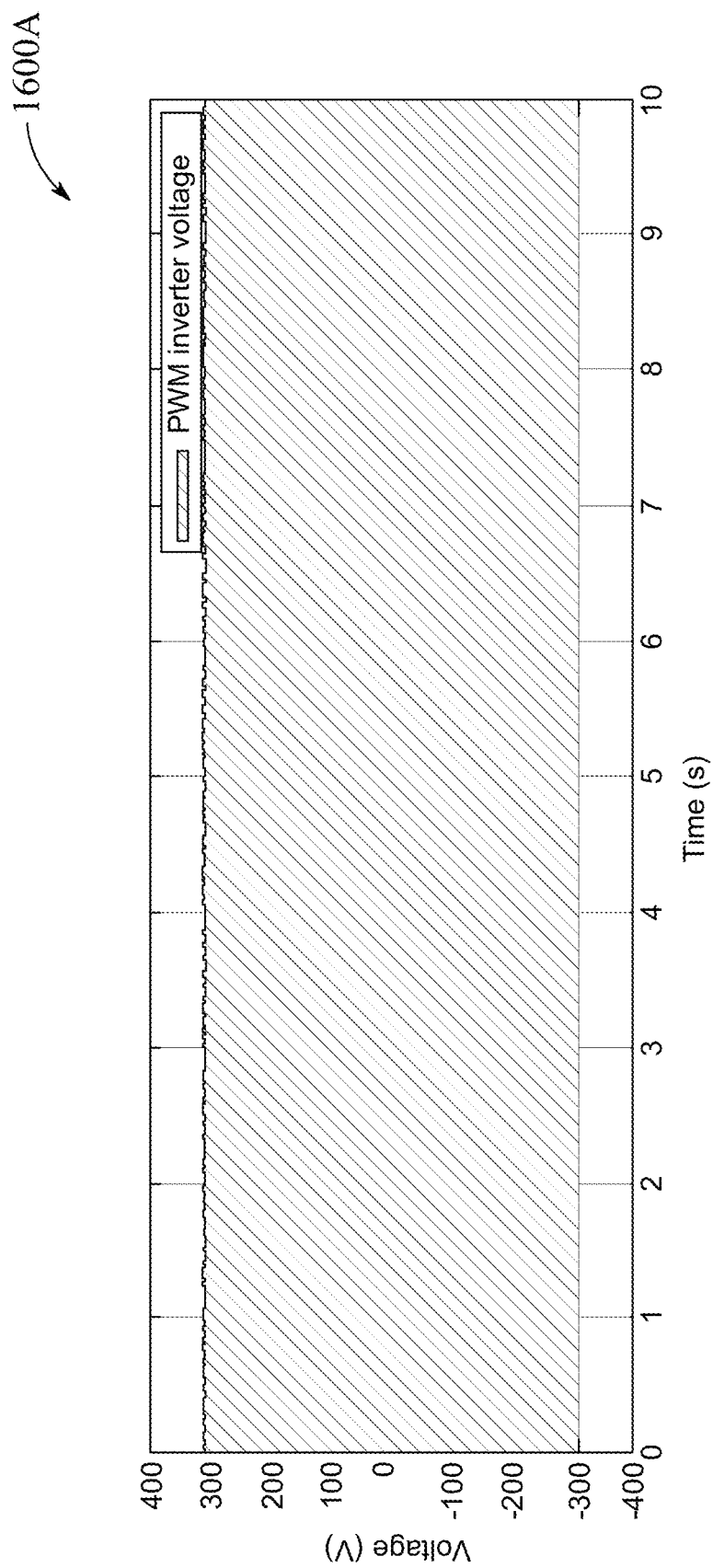
FIG. 16A is an exemplary graph depicting pulse width modulation inverter voltage output versus time, according to certain embodiments.
Figure 16B:
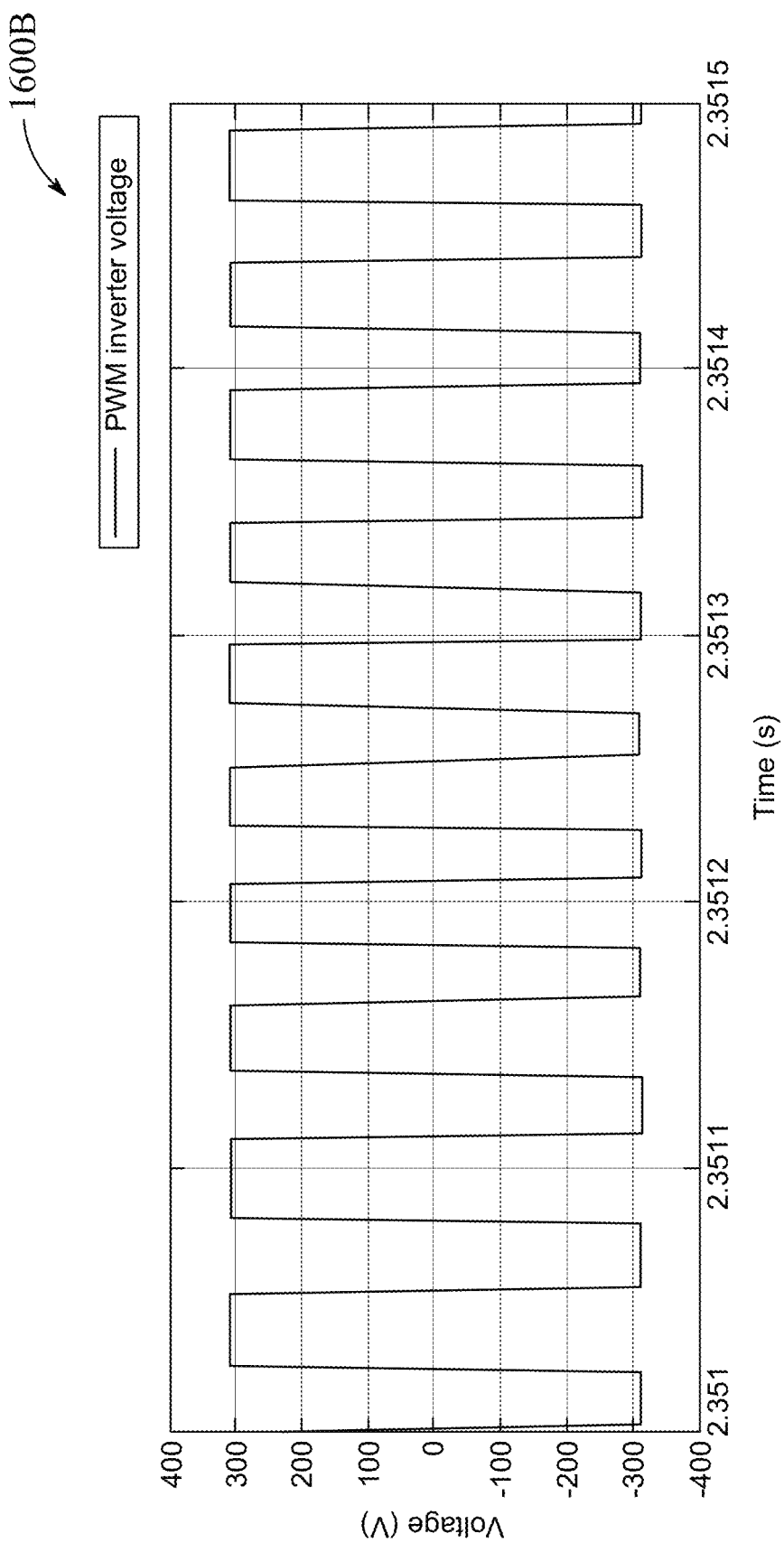
FIG. 16B is an exemplary graph depicting zoomed view of the pulse width modulation inverter voltage output of the graph of FIG. 16A, according to certain embodiments.

Referring to FIG. 13, illustrated is an exemplary graph 1300 depicting relationship between input mechanical torque to PMSG response subjected to variation in the wind speed. As may be seen from the graph 1300, the mechanical torque also follows the variation in the wind speed accurately. Further referring to FIG. 14, illustrated is an exemplary graph 1400 depicting response of electromagnetic torque of the PMSG 122 subjected to the wind speed. As may be seen from the graph 1400, the electromagnetic torque also follows mechanical torque. Now referring to FIG. 15, illustrated is an exemplary graph 1500 depicting zoomed (enlarged) view of electromagnetic torque of the PMSG 122. As may be appreciated by a person skilled in the art, the graph 1500 shows the presence of noise. This noisy behavior may be because of the presence of noise in the stator current of the PMSG 122 and due to the chosen smallest sampling time. Also referring to FIG. 16A, illustrated is an exemplary graph 1600A depicting PWM inverter voltage output versus time; and referring to FIG. 16B, illustrated is an exemplary graph 1600B depicting zoomed (enlarged) view of the PWM inverter voltage output of the graph 1600A of FIG. 16A. As may be seen from the graph 1600A and the graph 1600B, the voltage response of PWM inverter is generally constant for practical purposes. Further, it may be appreciated that the steady state and dynamic operation of the wind turbine 101 with implementation of the proposed NN model 232 in terms of overshoot and settling time has been enhanced.

Figure 17:
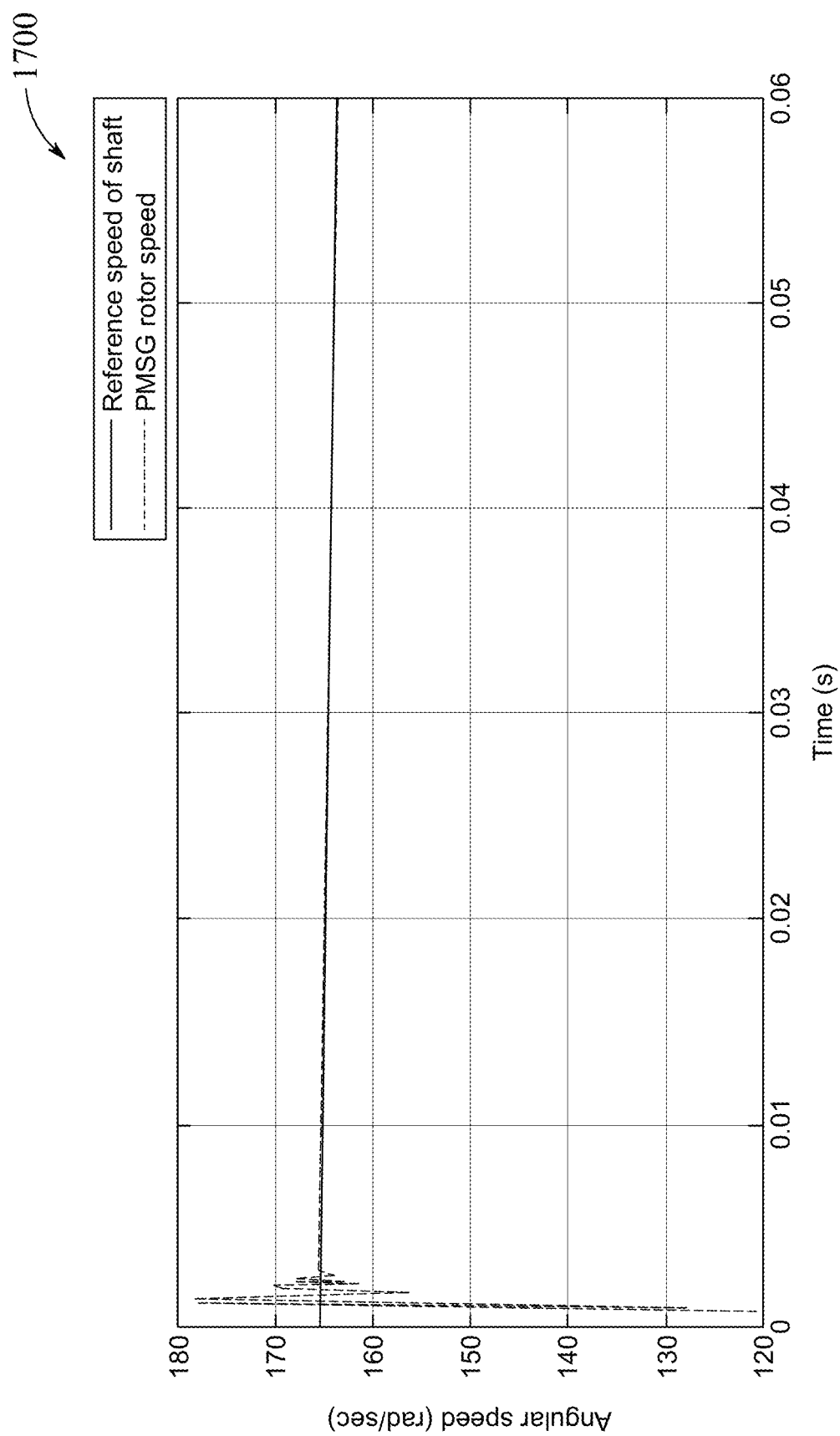
FIG. 17 is an exemplary graph depicting speed response of the wind turbine subjected to change in reference shaft speed thereof, according to certain embodiments.

To test the performance of the proposed method 500, the wind energy control system 100 was simulated for 60 milliseconds (ms), with an input wind speed decreasing from 12.5 m/s to 12.26 m/s. Referring to FIG. 17, illustrated is an exemplary graph 1700 depicting speed response of the PMSG rotor 122 (angular speed versus time) subjected to the change in reference shaft speed. The responses for both reference shaft speed and the PMSG rotor speed are presented in the graph 1700 of FIG. 17. As may be seen, the PMSG rotor speed achieves the reference speed in a short duration of 10 ms. That is, in embodiments of the present disclosure, the wind turbine 101 achieves the optimum angular rotation within 10 ms of the wind speed change. Further, as may be seen, as the wind speed decreases, the PMSG rotor speed also decreases and follows the reference shaft speed.

Figure 18:
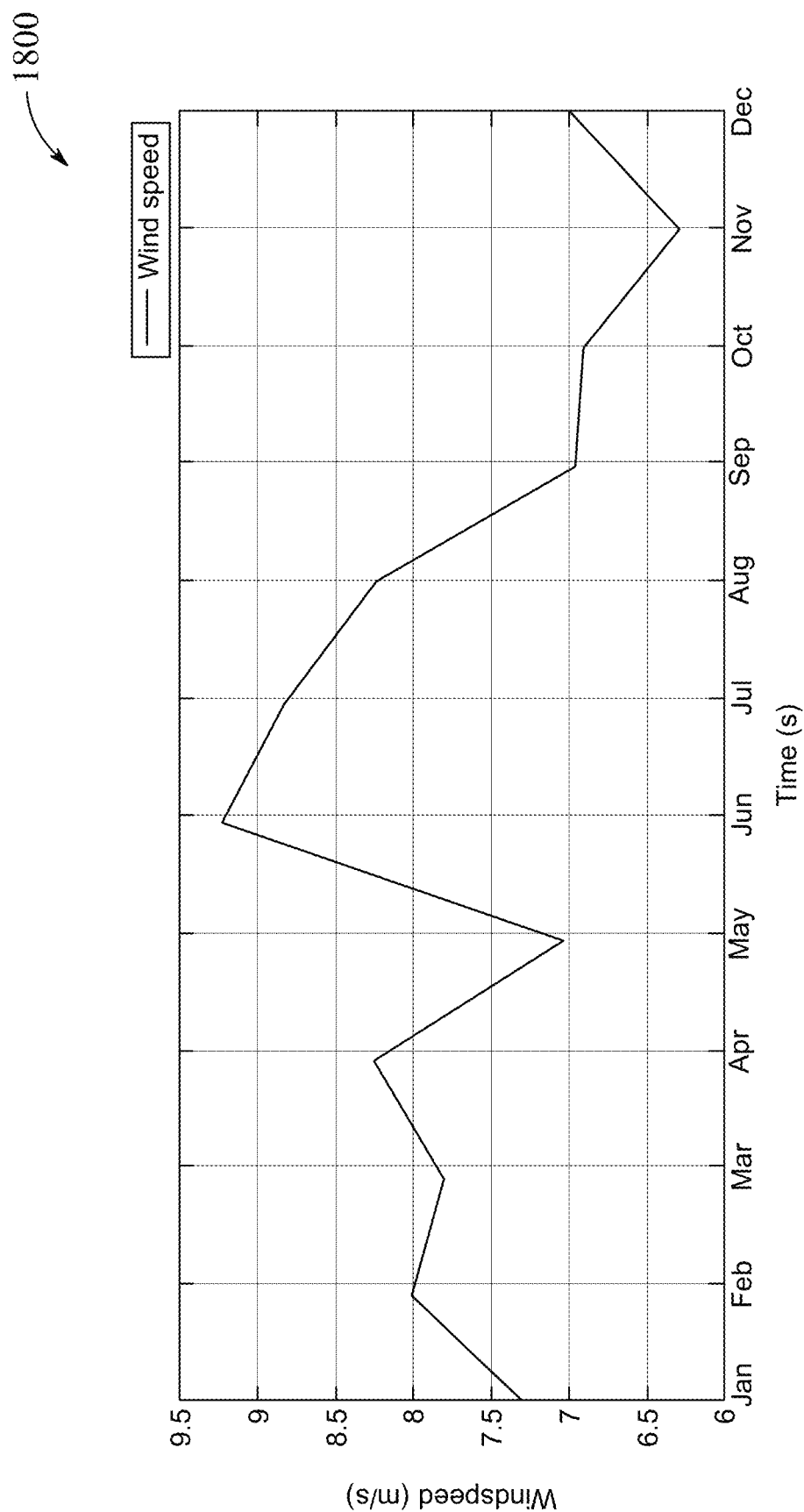
FIG. 18 is a graph showing distribution of monthly averaged wind speed for a certain period at a sample site, according to certain embodiments.
Figure 19:
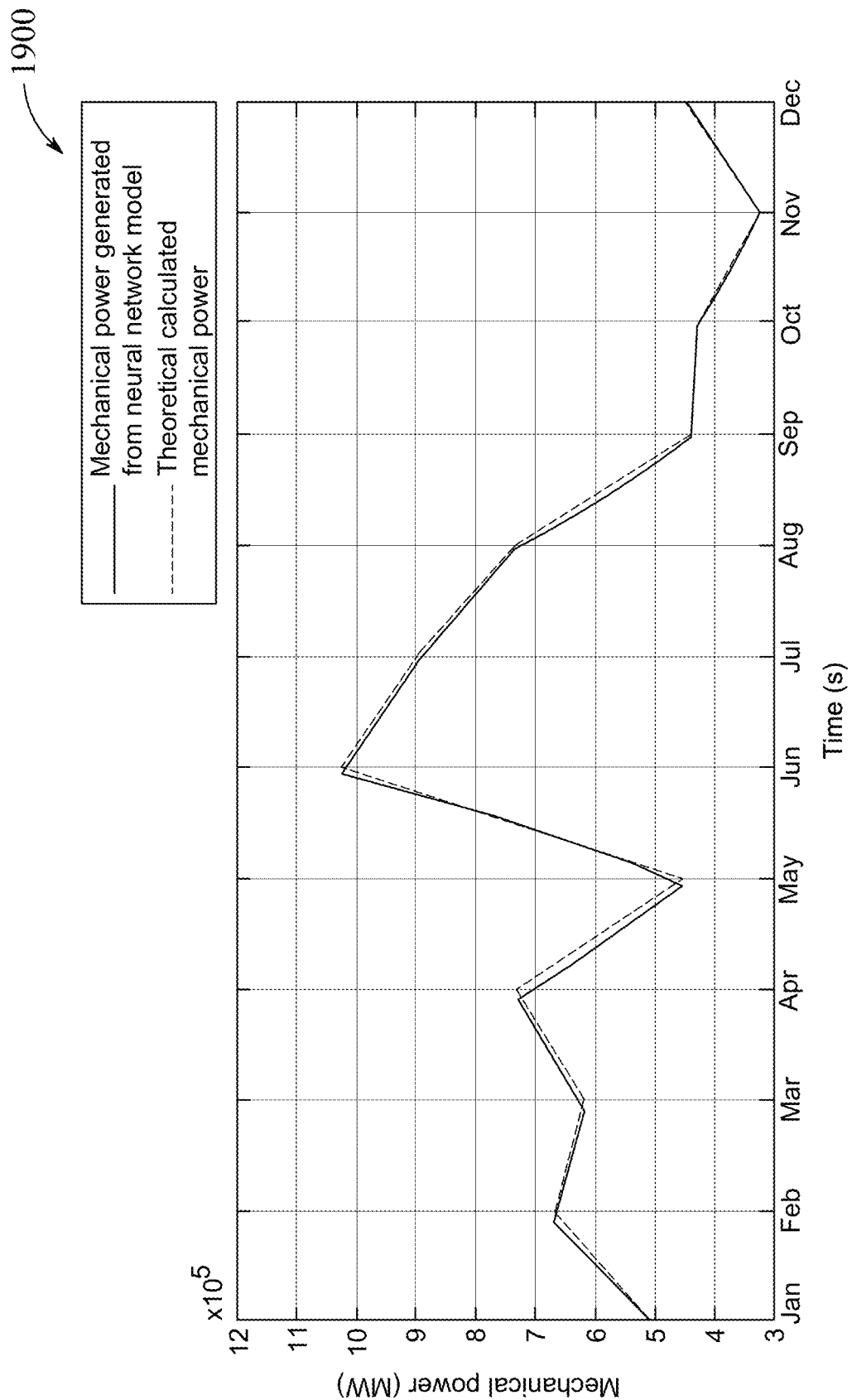
FIG. 19 is a graph showing mechanical power generated from the wind turbine model as well as theoretical and calculated mechanical power under real input wind speed for the sample site, according to certain embodiments.

Further, to validate and confirm the robustness of the proposed method 500, the designed model was subjected to real time dataset of Eastern province (i.e. Hafar Al-Batin), KSA (28.268806° N, 44.203111° E). Monthly averaged wind speed for a year recorded at 80 meters height was used to quantify the performance of the designed control system under real conditions. The dataset was obtained from renewable resource atlas, King Abdullah city for Atomic and Renewable Energy (K.A. CARE). Referring to FIG. 18, illustrated is a graph 1800 showing the distribution of monthly averaged wind speed for twelve months in a year at 80 meters height in Hafar Al-Batin. The proposed NN-based control system for wind turbine model was simulated with these real wind speed data. Referring to FIG. 19, illustrated is a graph 1900 showing mechanical power generated from NN-based Wind turbine model as well as theoretical and calculated mechanical power under real input wind speed for Hafar Al-Batin. As may be seen from the graph 1900 of FIG. 19, the mechanical power of the NN-based wind turbine model followed and tracked effectively the theoretical and estimated maximum power. Herein, the theoretical maximum power was estimated by using the equations (7) and (8) (as discussed above), where the optimum tip speed ratio was selected as 6.5 (i.e., $\lambda_{opt}$=6.5), the blade pitch angle was selected as zero (i.e., β=0) and maximum power coefficient was estimated to be 0.4818 (i.e., $C_{pmax}$=0.4818).

Table 2 below shows the maximum power generated from the NN model 232, and theoretical and estimated power at given wind speed of Hafar Al-Batin. During the month of June, the wind speed reached up to 9.23 m/s thereby increasing the mechanical power generated from the NN based wind turbine model to 1.025 MW. The proposed control system was found to be robust for a real time field wind data of Hafar Al-Batin with an error less than 0.27%.

TABLE 2

Maximum power generated from NN model and Theoretical calculated power at given wind speed of Hafar Al-Batin

| Month | Wind speed (m/s) | Theoretical calculated Maximum power (MW) | Mechanical power generated from designed NN model (MW) | Error (%) |
|---|---|---|---|---|
| January | 7.30 | 0.507 | 0.507 | 0.00 |
| February | 8.01 | 0.669 | 0.668 | 0.14 |
| March | 7.80 | 0.618 | 0.618 | 0.00 |
| April | 8.25 | 0.732 | 0.730 | 0.27 |
| May | 7.03 | 0.453 | 0.452 | 0.22 |
| June | 9.23 | 1.025 | 1.025 | 0.00 |
| July | 8.83 | 0.898 | 0.897 | 0.11 |
| August | 8.27 | 0.737 | 0.736 | 0.13 |
| September | 6.96 | 0.439 | 0.439 | 0.00 |
| October | 6.91 | 0.430 | 0.429 | 0.23 |
| November | 6.29 | 0.324 | 0.324 | 0.00 |
| December | 7.01 | 0.449 | 0.449 | 0.00 |

Figure 20:
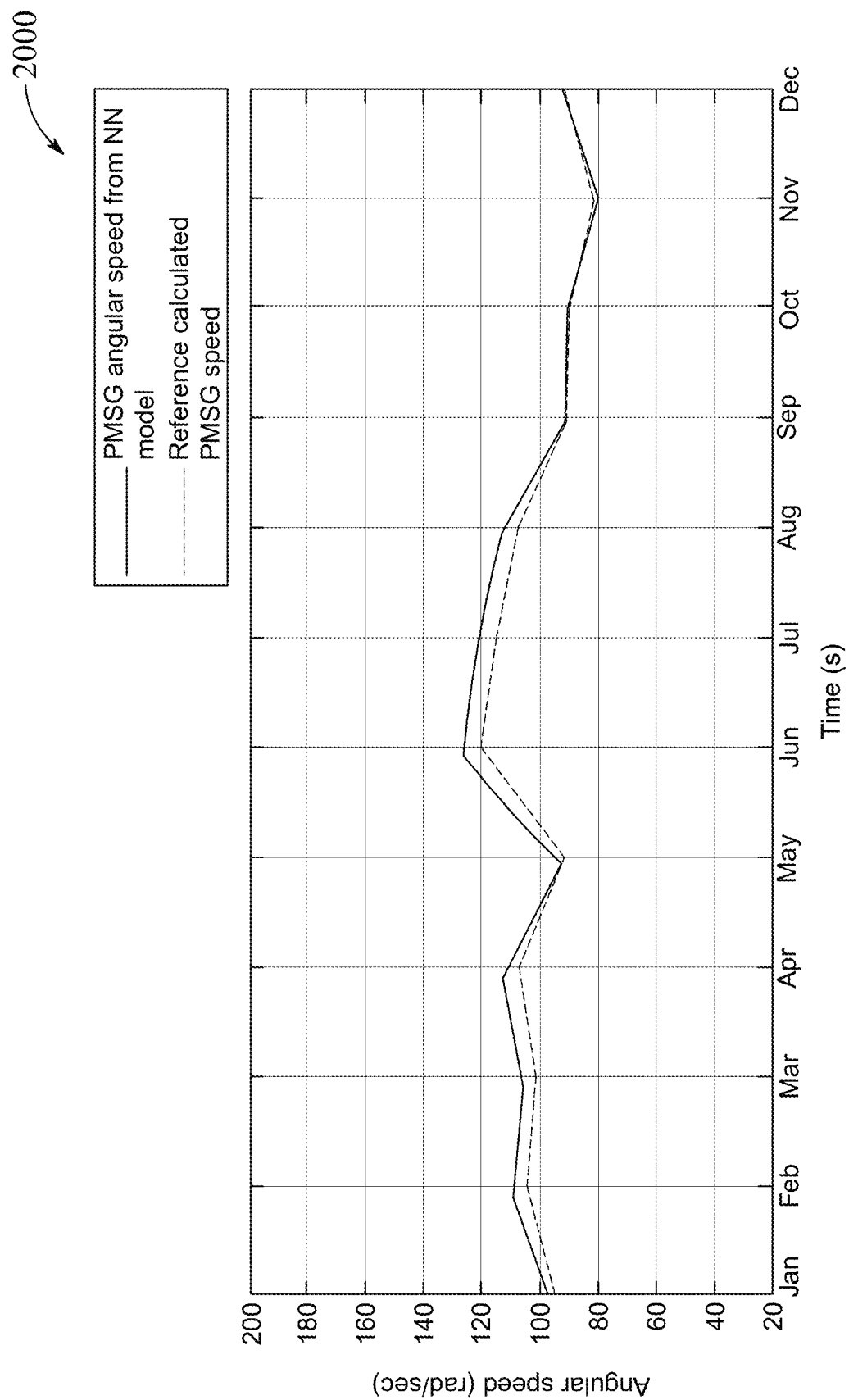
FIG. 20 is a graph showing angular speed of the wind turbine generated from the neural network to generate maximum power at the sample site, according to certain embodiments.
Figure 21:
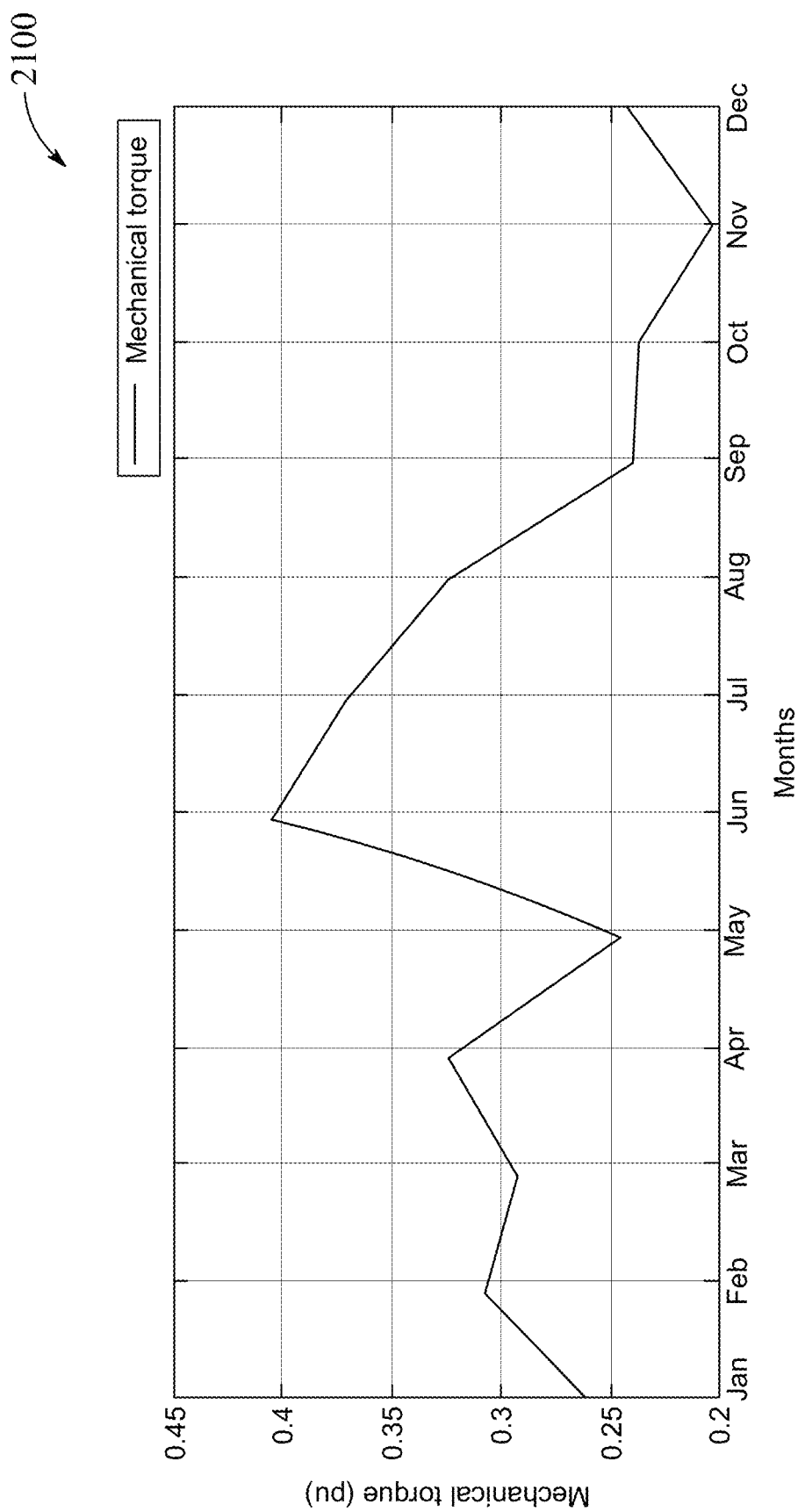
FIG. 21 is a graph showing mechanical torque generated from the wind turbine model when subjected to real wind speed data of the sample site, according to certain embodiments.
Figure 22:
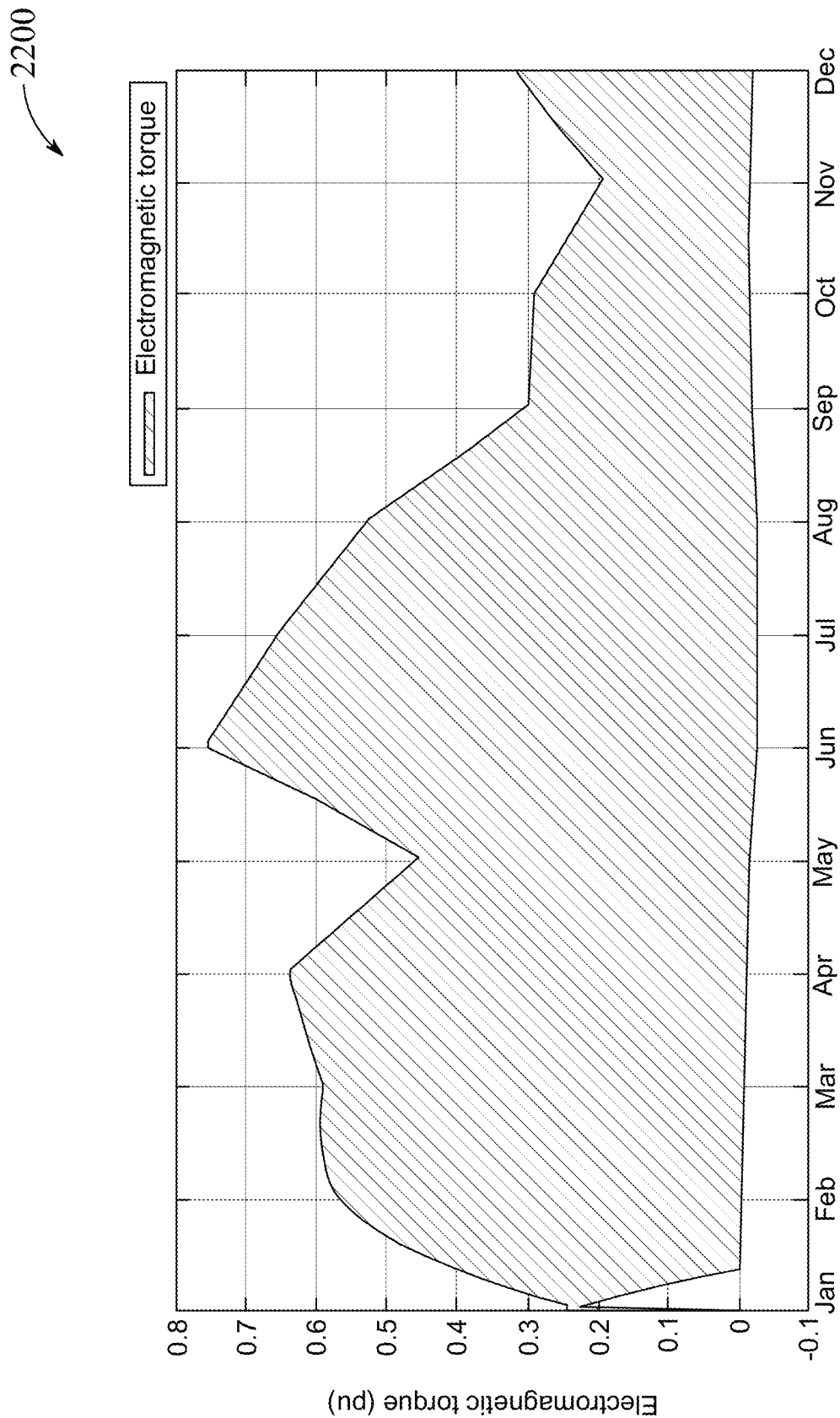
FIG. 22 is a graph showing response of electromagnetic torque generated from the wind turbine model under real wind speed data of the sample site, according to certain embodiments.

Referring to FIG. 20, illustrated is a graph 2000 showing PMSG angular speed generated from the NN model 232, tracking the reference PMSG speed to generate maximum power at Hafar Al-Batin. As may be seen from the graph 2000, the angular speed generated from the NN-based wind turbine model that drives the PMSG rotor tracked the estimated angular speed efficiently at which the maximum power was achieved. Further, referring to FIG. 21, illustrated is a graph 2100 showing mechanical torque generated from the NN based wind turbine model when subjected to real wind speed data of Hafar Al-Batin. As may be seen from the graph 2100, the mechanical torque generated from the proposed model followed the monthly variation in wind speed. Furthermore, referring to FIG. 22, illustrated is a graph 2200 showing response of the electromagnetic torque generated from the NN based wind turbine model under real wind speed data of Hafar Al-Batin. As may be contemplated by a person skilled in the art, the graph 2200 predicts noisy behavior for the PMSG based wind turbine 101 because of the presence of noise in stator current in the generator 122.

Thereby, the present disclosure provides an intelligent control strategy for the PMSG based wind turbines. The proposed speed control of the PMSG was implemented with the help of the PI controller which was provided with the error of the reference shaft speed and the PMSG rotor speed. The MPPT was tracked and the PMSG generator 122 of the WECS 100 was capable to operate at reference speed as instructed by reference shaft speed generated by the NN model 232. The present wind turbine control module 124 and the method 500 achieve maximum power output under fluctuating wind speed with an error as low as 0.0025%. The robustness of the wind turbine control module 124 and the method 500 was confirmed as the PMSG rotor achieved the reference speed in less than 10 ms. The robustness of the proposed control system is further verified from the response of the angular speed and torque of the shaft rotor and the PMSG rotor, respectively, as both factor responded instantly to any change in the wind speed. The proposed NN-based control system was further validated with a real time dataset recoded in Eastern province (i.e. Hafar Al-Batin, 28.268806° N, 44.203111° E) of KSA. The present wind turbine control module 124 and the method 500 was found to be robust for a real time field wind data with an acceptable error as low as 0.27%. To the extent, the angular speed generated from the NN-based wind turbine model (that drives the PMSG rotor) effectively tracked the estimated angular speed at maximum power. Thus, the proposed NN-based intelligent control by the present wind turbine control module 124 and the method 500 may prove to be indispensable to design and specify wind turbine setup for optimum wind energy harvesting.

Figure 23:
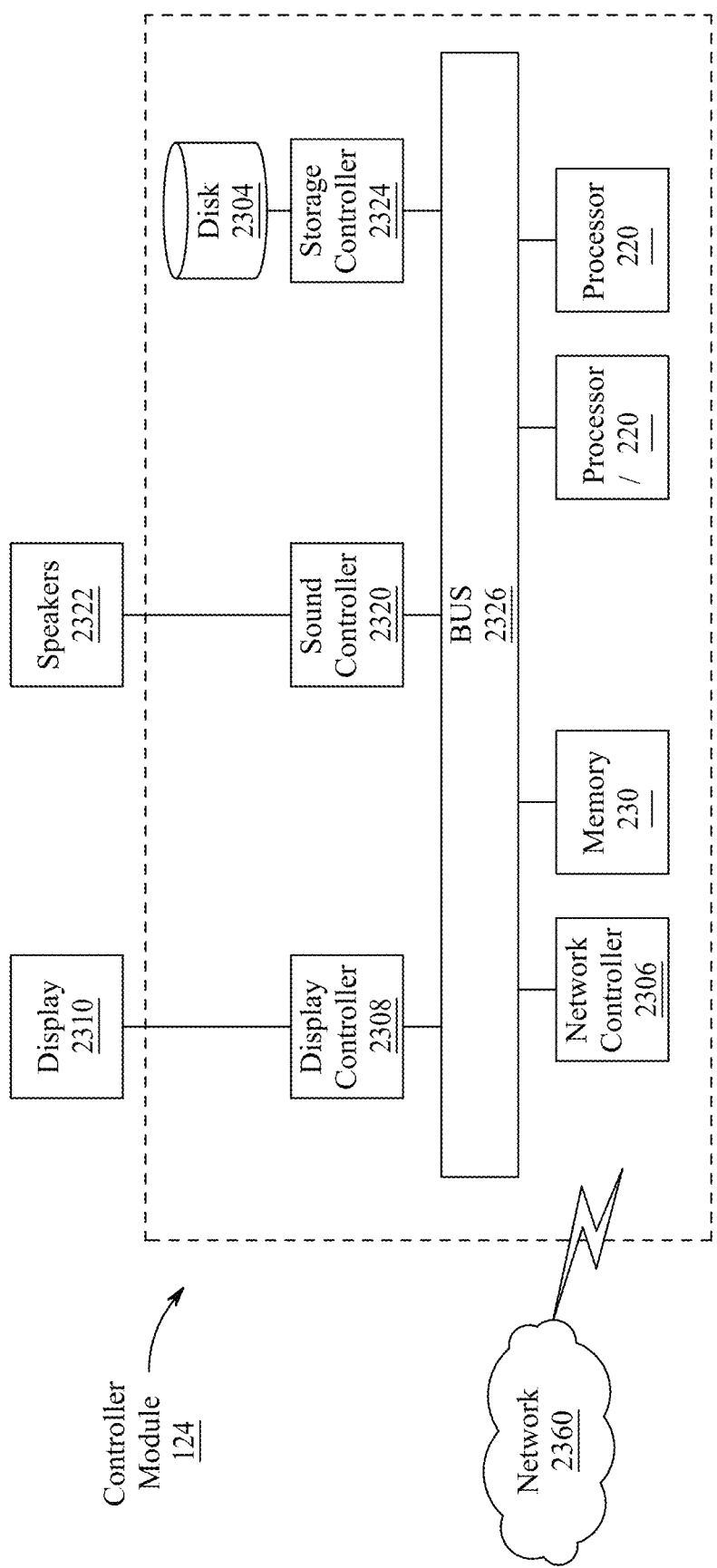
FIG. 23 is an illustration of a non-limiting example of details of computing hardware used in the computing system, according to certain embodiments.

Next, further details of hardware description of the controller module 124 which may be implemented to control various functions and operation of the present wind energy control system 100 according to exemplary embodiments is described with reference to FIG. 23. In FIG. 23, the controller module 124 is described which is representative of a computing environment in which the controller module 124 includes a processor 220 (alternately referred to as a CPU) which performs the processes described above/below. The process data and instructions may be stored in memory 230 (such as, a non-transitory computer readable medium). These processes and instructions may also be stored on a storage medium disk 2304 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU (processor) 220 and an operating system such as Microsoft Windows 7®, Microsoft Windows 10®, UNIX®, Solaris®, LINUX®, Apple® MAC-OS and other systems known to those skilled in the art.

The hardware elements in order to achieve the computing device may be realized by various circuitry elements, known to those skilled in the art. For example, processor 220 may be a Xenon® or Core processor from Intel® of America or an Opteron® processor from AMD® of America, or may be other processor types that would be recognized by one of ordinary skill in the art. Alternatively, the processor 220 may be implemented on an FPGA, ASIC, PLD or using discrete logic circuits, as one of ordinary skill in the art would recognize. Further, processor 220 may be implemented as multiple processors cooperatively working in parallel to perform the instructions of the inventive processes described above.

The controller module 124 also includes a network controller 2306, such as an Intel Ethernet PRO network interface card from Intel Corporation of America, for interfacing with network 2360. As can be appreciated, the network 2360 can be a public network, such as the Internet, or a private network such as an LAN or WAN network, or any combination thereof and can also include PSTN or ISDN sub-networks. The network 2360 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device further includes a display controller 2308, such as a NVIDIA GeForce GTX or Quadro graphics adaptor from NVIDIA Corporation of America for interfacing with display 2310, such as a Hewlett Packard HPL2445w LCD monitor.

The general purpose storage controller 2324 connects the storage medium disk 2304 with communication bus 2326, which may be an ISA, EISA, VESA, PCI, or similar, for interconnecting all of the components of the computing device. A description of the general features and functionality of the display 2310, the display controller 2308, storage controller 2324, network controller 2306, and the sound controller 2320 is omitted herein for brevity as these features are known.

In the present embodiments, the non-transitory computer readable medium having instructions stored therein that, when executed by one or more processors, cause one or more processors to perform a control method for wind turbine control. The method comprises generating a data set, wherein wind speed and tip speed ratio are averagely sampled. The method further comprises training a neural network model, wherein wind speed and tip speed ratio are fed as input, and a maximum power ($P_{max}$) and an optimum rotor speed ($\omega_{opt}$) are output. The method further comprises testing of the neural network model with random input wind speed. The method further comprises speed control of a Permanent Magnet Synchronous Generator (PMSG) based wind turbine according to the $P_{max}$ from the neural network model.

In one or more exemplary embodiments, the instructions stored cause the one or more processors to calculate the maximum power ($P_{max}$) at any given wind speed by:

$$P_{max} = \tfrac{1}{2}\rho A V_w^3 C_{pmax}(\lambda,\beta)$$

where $\rho$ is air density, A is blade swept area, $V_w$ is wind velocity and $C_{pmax}$ is a power coefficient which is depicted by function of $(\lambda,\beta)$.

In one or more exemplary embodiments, the instructions stored cause the one or more processors to calculate the optimum rotor speed ($\omega_{opt}$) at the maximum power by:

$$\omega_{opt} = \frac{\lambda_{opt} V_w}{R}$$

where $\lambda_{opt}$ is optimal tip speed ratio, $V_w$ is wind velocity and R is the radius of the wind turbine rotor.

In one or more exemplary embodiments, the instructions stored therein cause the PMSG based wind turbine to achieve a maximum power output and an optimum reference angular speed under fluctuating wind speed between 3 m/s and 19.4 m/s.

In one or more exemplary embodiments, the instructions stored therein cause the PMSG based wind turbine to shut down for wind speeds below 3 m/s and above 19.4 m/s.

In one or more exemplary embodiments, the instructions stored therein cause the neural network model to be trained using a feed forward back propagation method.

In one or more exemplary embodiments, the instructions stored therein cause the neural network model to be trained using a radial basis method.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A neural network (NN) trained wind turbine control apparatus for a wind turbine, the neural network (NN) trained wind turbine control apparatus comprising:
   a controller module, the controller module comprising:
      a memory and
      a processor, wherein the processor includes instructions to control the wind turbine,
   wherein the wind turbine comprises:
      a generator,
      a high-speed shaft,
      a gearbox,
      a low-speed shaft, and
      a rotor and one or more blades connected to the rotor;
   wherein the blades have a length R equivalent to a radius of the wind turbine, wherein each blade of the one or more blades has a blade tip, a blade pitch angle, a blade swept area, and a tip speed, and a tip speed ratio (TSR),
   wherein the TSR is a ratio between a tangential speed of the blade tip and a wind velocity,
   wherein the controller module is configured to implement a machine learning neural network method to control a rotor speed of the wind turbine to achieve an optimum rotor speed and a maximum power as determined by the neural network at varying wind velocities, $V_w$, the method including
      generating a data set including at least 120 samples each of wind velocities and tip speed ratios at wind speeds between 3 to 19.4 m/s;

determining the maximum power and the optimum rotor speed for every sample of wind velocity in the data set;

training a neural network (NN) model using the data set in which each sample of wind velocity in the data set is fed as an input and the determined optimum rotor speed and the determined maximum power are output from the NN model, testing the NN model with random input wind speed; and controlling the rotor of the wind turbine based on a current wind velocity and the optimum rotor speed determined by the NN model.

2. The neural network (NN) trained wind turbine control apparatus of claim 1, wherein the optimum rotor speed is given by:

$$\omega_{opt} = (\lambda_{opt} V_w)/R$$

where $\lambda_{opt}$ is an optimal tip speed ratio, and $V_w$ is a current wind velocity.

3. The neural network (NN) trained wind turbine control apparatus of claim 1, wherein the generator is a Permanent Magnet Synchronous Generator (PMSG).

4. The neural network (NN) trained wind turbine control apparatus of claim 1, wherein the maximum power ($P_{max}$) at any given wind speed is given by:

$$P_{max} = \tfrac{1}{2} \rho A V_w^3 C_{pmax}(\lambda, \beta)$$

where $\rho$ is an air density, A is a blade swept area, $V_w$ is wind velocity and $C_{pmax}$ is a power coefficient which is depicted by function of $(\lambda, \beta)$ where $\lambda$ is the tip speed ratio and $\beta$ is the pitch angle, the function being $$c_{pmax}(\lambda, \beta) = 0.22\left(\frac{116}{\lambda_i} = 0.4\beta = 5\right)e^{\frac{-12.5}{\lambda_i}} + 0.0068\lambda.$$

5. The neural network (NN) trained wind turbine control apparatus of claim 1, wherein the wind turbine achieves a maximum power output and an optimum rotor speed for a fluctuating wind speed between 3 m/s and 19.4 m/s.

6. The neural network (NN) trained wind turbine control apparatus of claim 1, wherein the trained wind turbine control apparatus stops the wind turbine only for wind speeds below 3 m/s and above 19.4 m/s.

7. The neural network (NN) trained wind turbine control apparatus of claim 1, wherein the controller changes the blade pitch angle only for wind speeds above 19.4 m/s.

8. The neural network (NN) trained wind turbine control apparatus of claim 1, wherein the controller adjusts the wind turbine to achieve the optimum rotor speed within 10 ms of a wind speed change.

9. A wind energy control method for a PMSG based wind turbine, wherein the PMSG based wind turbine comprises a controller module, a generator, a drive train, a rotor, and one or more blades; the controller module comprising a memory and a processor; the method comprising:

generating a data set including at least 120 samples each of wind velocities and 120 tip speed ratios at wind speeds between 3 to 19.4 m/s;

determining a maximum power and an optimum rotor speed ($\omega_{opt}$) for every sample of wind velocity in the data set;

training a neural network (NN) model using the data set in which each sample of wind velocity in the data set is fed as an input and the determined optimum rotor speed and the determined maximum power are output from the NN model;

testing the NN model with random input wind speed; and controlling the rotor of the PMSG based wind turbine based on a current wind velocity and the optimum rotor speed determined by the NN model.

10. The method of claim 9, wherein a feed forward back propagation method is used in the training of the neural network (NN) model.

11. The method of claim 9, wherein a radial basis function method is used in the training of the neural network (NN) model.

12. The method of claim 9, wherein the NN model determines that the maximum power ($P_{max}$) at any given wind speed is given by:

$$P_{max} = \tfrac{1}{2} \rho A V_w^3 C_{pmax}(\lambda, \beta)$$

where $\rho$ is air density, A is blade swept area, $V_w$ is wind velocity and $C_{pmax}$ is a power coefficient which is depicted by function of $(\lambda, \beta)$, the function being $$C_{pmax}(\lambda, \beta) = 0.22\left(\frac{116}{\lambda_i} = 0.4\beta - 5\right)e^{\frac{-12.5}{\lambda_i}} + 0.0068\lambda.$$

13. The method of claim 9, wherein the NN model determines the optimum rotor speed ($\omega_{opt}$) is given by:

$$\omega_{opt} = (\lambda_{opt} V_w)/R$$

where $\lambda_{opt}$ is optimal tip speed ratio, $V_w$ is wind velocity and R is a radius of the wind turbine.

14. A non-transitory computer readable medium having instructions stored therein that, when executed by one or more processors, cause one or more processors to perform a control method for wind turbine control, the method comprising:

generating a data set including at least 120 samples each of wind velocities and tip speed ratios at wind speeds between 3 to 19.4 m/s;

determining a maximum power and an optimum rotor speed for every sample of wind velocity in the data set;

training a neural network model based upon using the data set in which each sample of wind velocity in the data set is fed as an input and the determined optimum rotor speed and the determined maximum power are output from the neural network model;

testing of the neural network model with random input wind speed; and controlling a Permanent Magnet Synchronous Generator (PMSG) based wind turbine rotor speed according to a current wind velocity and the optimum rotor speed determined by the trained neural network model.

15. The non-transitory computer readable medium of claim 14, wherein the instructions stored cause the one or more processors to calculate the maximum power ($P_{max}$) at any given wind velocity by:

$$P_{max} = \tfrac{1}{2} \rho A (V_w)^3 C_{pmax}(\lambda, \beta)$$

where $\rho$ is an air density, A is a blade swept area, $V_w$ is the wind velocity and $C_{pmax}$ is a power coefficient which is depicted by function of $(\lambda, \beta)$, the function being, $$C_{pmax}(\lambda, \beta) = 0.22\left(\frac{116}{\lambda_i} - 0.4\beta - 5\right)e^{\frac{-12.5}{\lambda_i}} + 0.0068\lambda.$$

16. The non-transitory computer readable medium of claim 14, wherein the instructions stored cause the one or more processors to calculate the optimum rotor speed ($\omega_{opt}$) by:

$$\omega_{opt} = (\lambda_{opt}V_w)/R$$

where $\lambda_{opt}$ is optimal tip speed ratio, $V_w$ is wind velocity and R is a radius of the wind turbine.

17. The non-transitory computer readable medium of claim 14, wherein the instructions stored therein cause the PMSG based wind turbine to achieve a maximum power output and an optimum reference angular speed for fluctuating wind velocities between 3 m/s and 19.4 m/s.

18. The non-transitory computer readable medium of claim 14, wherein the instructions stored therein cause the PMSG based wind turbine to shut down only for wind speeds below 3 m/s and above 19.4 m/s.

19. The non-transitory computer readable medium of claim 14, wherein the instructions stored therein cause the neural network model to be trained using a feed forward back propagation method.

20. The non-transitory computer readable medium of claim 14, wherein the instructions stored therein cause the neural network model to be trained using a radial basis method.

\* \* \* \* \*